US012400848B2

(12) United States Patent
Booy

(10) Patent No.: US 12,400,848 B2
(45) Date of Patent: Aug. 26, 2025

(54) INTEGRATED QJET AND Q0 RODSETS SHARING THE SAME ROD DIAMETERS AND RF POTENTIAL

(71) Applicant: DH Technologies Development Pte. Ltd., Singapore (SG)

(72) Inventor: Aaron T. Booy, Barrie (CA)

(73) Assignee: DH TECHNOLOGIES DEVELOPMENT PTE. LTD., Singapore (SG)

(*) Notice: Subject to any disclaimer, the term of this patent is extended or adjusted under 35 U.S.C. 154(b) by 297 days.

(21) Appl. No.: 17/913,225

(22) PCT Filed: Mar. 19, 2021

(86) PCT No.: PCT/IB2021/052328

§ 371 (c)(1), (2) Date: Sep. 21, 2022

(87) PCT Pub. No.: WO2021/191759

PCT Pub. Date: Sep. 30, 2021

(65) Prior Publication Data

US 2023/0178354 A1 Jun. 8, 2023

Related U.S. Application Data

(60) Provisional application No. 63/000,346, filed on Mar. 26, 2020.

(51) Int. Cl.
*H01J 49/06* (2006.01)

(52) U.S. Cl.
CPC .......... *H01J 49/063* (2013.01); *H01J 49/068* (2013.01)

(58) Field of Classification Search
CPC .............................. H01J 49/063; H01J 49/068
See application file for complete search history.

(56) References Cited

U.S. PATENT DOCUMENTS 3,105,899 A 10/1963 Karl-Georg et al.
4,814,697 A * 3/1989 Kruger ............... G01R 1/06722 324/755.05

(Continued)

FOREIGN PATENT DOCUMENTS

CN 105869987 A 8/2016
CN 206179824 U 5/2017

(Continued)

OTHER PUBLICATIONS

KR20050017759 English Translation (Year: 2005).*

(Continued)

*Primary Examiner* — David E Smith
*Assistant Examiner* — Laura Eloise Tandy
(74) *Attorney, Agent, or Firm* — Potomac Law Group, PLLC; Reza Mollaaghababa; Brian Hairston

(57) ABSTRACT

In one aspect, an ion guide assembly for use in a mass spectrometry system is disclosed, which comprises a first plurality of multipole rods that are arranged to allow passage of ions therebetween, a second plurality of multipole rods that are arranged to allow passage of ions therebetween, and a board disposed between the first and second plurality of rods, the board comprising an ion lens. The first and second plurality of rods are coupled to the board, and the rods of the first plurality of rods are pairwise aligned with, and coupled to, rods of the second plurality of rods.

20 Claims, 23 Drawing Sheets

(56) References Cited

U.S. PATENT DOCUMENTS

| | | | | | |
|---|---|---|---|---|---|
| 5,847,386 | A | 12/1998 | Thomson et al. | | |
| 6,111,250 | A * | 8/2000 | Thomson | H01J 49/005 250/281 | |
| 7,034,294 | B2 * | 4/2006 | Schwartz | H01J 49/423 250/292 | |
| 2009/0095898 | A1 | 4/2009 | Collings et al. | | |
| 2013/0015340 | A1 | 1/2013 | Steiner | | |
| 2015/0021468 | A1 * | 1/2015 | Steiner | H01J 49/068 250/281 | |

FOREIGN PATENT DOCUMENTS

| | | | | |
|---|---|---|---|---|
| CN | 116959950 | A * | 10/2023 | |
| JP | 7156553 | B2 * | 10/2022 | H01J 49/062 |
| KR | 20050017759 | A * | 2/2005 | |
| WO | 2019167026 | A1 | 9/2019 | |

OTHER PUBLICATIONS

CN116959950 English Translation (Year: 2023).*
JP 7156553 English Translation (Year: 2022).*
International Search Report for International Application No. PCT/IB2021/052328 dated Jun. 24, 2021.
Written Opinion for International Application No. PCT/IB2021/052328 dated Jun. 24, 2021.
Office Action for Chinese Patent Application 202180023678.X mailed on Jun. 6, 2025.

* cited by examiner

INTEGRATED QJET AND Q0 RODSETS SHARING THE SAME ROD DIAMETERS AND RF POTENTIAL

RELATED APPLICATION

This application is a 35 U.S.C. 371 national stage filing of International Application No. PCT/IB2021/052328, filed on Mar. 19, 2021, which claims priority to U.S. provisional application No. 63/000,346 filed on Mar. 26, 2020, entitled "Integrated QJet and Q0 Rodsets Sharing the Same Rod Diameters and RF Potential," which is incorporated herein by reference in its entirety.

BACKGROUND

The present teachings are generally directed to an integrated ion guide assembly for use in a mass spectrometer for guiding ions received from an ion source to downstream regions of the spectrometer.

Mass spectrometry (MS) is an analytical technique for measuring mass-to-charge ratios of molecules, with both qualitative and quantitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during sample processing.

In some mass spectrometers, ion optics are employed for introducing ions from an ion source to the mass spectrometer. By way of example, in some quadrupole mass spectrometers, an initial ion optic composed of four rods arranged in a quadrupole configuration (herein referred to as QJet ion optic) is employed to capture and focus ions generated by an upstream ion source (e.g., an atmospheric pressure ion source) into a subsequent ion optic (herein referred to as Q0 ion optic) that is composed of four quadrupole rods positioned in a chamber at a lower pressure and separated from the QJet ion optic via an ion lens.

Conventional ion guide optics can be expensive to fabricate and their cleaning after use can be time consuming.

SUMMARY

In one aspect, an ion guide assembly for use in a mass spectrometry system is disclosed, which comprises a first plurality of multipole rods that are arranged to allow passage of ions therebetween, a second plurality of multipole rods that are arranged to allow passage of ions therebetween, and a board disposed between the first and second plurality of rods, the board comprising an ion lens. The first and second plurality of rods are coupled to the board, and the rods of the first plurality of rods are pairwise aligned with, and coupled to, rods of the second plurality of rods.

In some embodiments, the first and second plurality of multipole rods are in pairwise electrical contact. In some other embodiments, the first and second plurality of multipole rods are electrically insulated from one another.

In some embodiments, the first and second plurality of multipole rods have substantially cylindrical shapes. In some such embodiments, the first and second plurality of multipole rods have substantially the same diameter.

In some embodiments, the first and the second plurality of multipole rods are electrically coupled to the same radio frequency (RF) voltage source. In some embodiments, the first and the second plurality of multipole rods are electrically coupled to different radio frequency (RF) voltage sources.

In some embodiments, the first and the second plurality of multipole rods are electrically coupled to the same direct current (DC) voltage source. In some other embodiments, the first and the second plurality of multipole rods are electrically coupled to different direct current (DC) voltage sources.

In some embodiments, the first and the second plurality of multipole rods are pairwise aligned and physically connected to one another through the board via a plurality of electrically conducting or electrically insulating connectors (e.g., posts/screws). For example, the connectors can be formed of a suitable electrically conductive material (e.g., copper) or insulating polymeric material, such as PEEK (polyether ether ketone). The use of common connection posts can allow maintaining the two sets of multipole rods at the same electrical potential (e.g., when connecting posts provide an electrically conductive path between the two sets of multipole rods), or at different electrical potentials (e.g., when the connecting posts electrically insulate the two sets of multipole rods from one another).

In some embodiments, the entire body of a connector can be made of an electrically conductive or insulating material. In other embodiments, a connector can be made partially of an electrically conductive material and partially of an electrically insulating material. In some embodiments, the first and the second plurality of rods are pairwise aligned and physically connected to one another via a plurality of threaded metal connectors, e.g., connectors formed of copper.

In some embodiments, the connectors (e.g., a plurality of metal rods) have a length in a range of about 60 mm to about 75 mm.

In some embodiments, the first and second plurality of rods are aligned and physically connected to one another through the board via a male-to-female or a female-to-female threaded connection.

In some embodiments, each of the first and the second plurality of multipole rods comprises four rods that are arranged in a quadrupole configuration. In other embodiments, the first and the second plurality of multipole rods can have other configurations, e.g., a hexapole configuration. In some embodiments, the first and the second plurality of rods are uniformly spaced from one another.

In some embodiments, the board is disposed at an opening between two evacuated chambers, in one of which the first set of the multipole rods is disposed and in the other the second set of multipole rods is disposed, and is configured to provide a vacuum seal between the chambers. In some such embodiments, the board comprises a surface (herein referred to as the sealing surface) that is configured for providing the vacuum seal. In some such embodiments, the surface is plated.

In some embodiments, the sealing surface of the board comprises a smooth, gold surface that can mate with a groove provided in an inner surface of a housing of the ion guide assembly, or an O-ring, Bal seal or sealing gasket.

In some embodiments, the board can include one or more feedthroughs (herein also referred to as electrically conductive traces) that can be employed for application of an RF and/or DC signal to the rods.

In some embodiments, a second ion lens is disposed downstream of the ion lens disposed in the board. In some such embodiments, the second ion lens is disposed in a substrate. In some embodiments, a plurality of extension rods extend from the board to the substrate in which the second ion lens is disposed for coupling the board to the second ion lens, and hence the substrate.

In some embodiments, a plurality of orientation notches are disposed on at least one surface of the board so that when aligned and physically connected to one another, the first and the second plurality of multipole rods engage said plurality of orientation notches.

In some embodiments, the board comprises one or more feedthroughs that are configured for providing one or more electrical connections to the second ion lens. The feedthroughs can include one or more standoffs that extend between the board and the second ion lens. The one or more standoffs can locate the second ion lens in the substrate. In some embodiments, the one or more standoffs can apply a pressure to the second ion lens against the substrate. In some embodiments, the one or more standoffs are configured for applying a sealing pressure between the board and the substrate.

The board can be formed of a variety of materials, including polymeric materials. Some examples of suitable materials include, without limitation, FR4, Rogers material, and/or a prepreg material.

In some embodiments, the board comprises a plurality of layers, e.g., 2, 3 or more layers, which can be bonded together.

In a related aspect, a method of disassembling an ion guide assembly from a mass spectrometry system is disclosed, which comprises decoupling radio frequency (RF) and direct current (DC) signal feedthroughs, and mechanically removing the ion guide assembly, where the ion guide assembly comprises a first plurality of rods arranged to allow passage of ions therebetween, a second plurality of rods arranged to allow passage of ions therebetween, a board disposed between the first and second plurality of rods, wherein the board comprises a lens, wherein the first and second plurality of rods are coupled to the board, and wherein the first plurality of rods are pairwise aligned with, and coupled to, the second plurality of rods. In some embodiments, the rods can be in pairwise electrical contact with one another.

In a related aspect, an ion guide assembly for use in a mass spectrometry system is disclosed, which comprises an orifice plate having an orifice for receiving ions from an ion source, said orifice plate comprising a plurality of electrical connectors for coupling to one or more voltage sources. The ion guide assembly further includes a first set of multipole rods extending from proximal ends to distal ends and arranged to allow passage of ions therebetween, and a second set of multipole rods extending from proximal ends to distal ends and arranged to allow passage of ions therebetween. A board is disposed between the first and second sets of multipole rods, said board having a plurality of openings through which the first and second sets of multipole rods are pairwise aligned and connected to one another, said board comprising a first ion lens and at least one electrical trace for application of a voltage to said first ion lens. A first electrically conductive rod electrically couples a first one of the electrical connectors of the orifice plate to the electrical trace for transmission of a voltage from at least one of the voltage sources to the first ion lens. The first electrically conductive rod is configured to physically connect the orifice plate to the board for structurally maintaining the board relative to the orifice plate. In some embodiments, a plurality of connectors are employed for coupling the distal ends of the first set of multipole rods to the proximal ends of the second set of the multipole rods. While in some embodiments, the connectors are electrically conductive, in other embodiments, they can be electrically insulating.

In some embodiments, a substrate is disposed in proximity of the distal ends of the second set of the multipole rods, which provides a recess for receiving a second ion lens. In some embodiments, the second ion lens can include two opposed front and back conductive surfaces and an orifice that extends between the front and the back conductive surfaces to allow passage of ions therethrough.

In some embodiments, the ion guide assembly can further include a pair of conductive rods, where one of said conductive rods electrically couples a second one of said electrical connectors of the orifice plate to said front conductive surface of the second lens and the other one of said conductive rods electrically couples a third one of said electrical connectors to said back conductive surface of the second ion lens for application of a voltage differential across said front and back conductive surfaces of the second ion lens. This pair of conductive rods not only provides conductive pathways for applying voltages to the ion lens of the ion guide assembly, but they also physically connect the orifice plate to the substrate via two openings provided in the board for structurally maintaining the orifice plate, the board, and the substrate relative to one another.

In some embodiments, one or more additional rods are employed solely for providing additional structural support (and not an electrically conductive path) to the ion guide assembly. By way of example, such rods can extend from the orifice plate to the substrate, via one or more openings in the board. More specifically, in some such embodiments, the proximal and the distal ends of such rods can be physically connected to the orifice plate and the substrate, respectively, via one or more openings provided in the orifice plate and the substrate by means of one or more screws and/or frictional fit.

The multipole rods employed in an ion guide assembly according to the present teachings can have a variety of different configurations. By way of example, in some embodiments, the multipole rods can be arranged in a quadrupole configuration while in other embodiments, the multipole rods can be arranged in a hexapole configuration.

Further, in many embodiments, the first and the second sets of multipole rods can have substantially identical diameters. Further, in some embodiments, the first and the second sets of multipole rods can have substantially identical inner spacing between the rods.

Further understanding of various aspects of the invention can be obtained by reference to the following detailed description in conjunction with the associated drawings, which are described briefly below.

DETAILED DESCRIPTION

Figure 1:
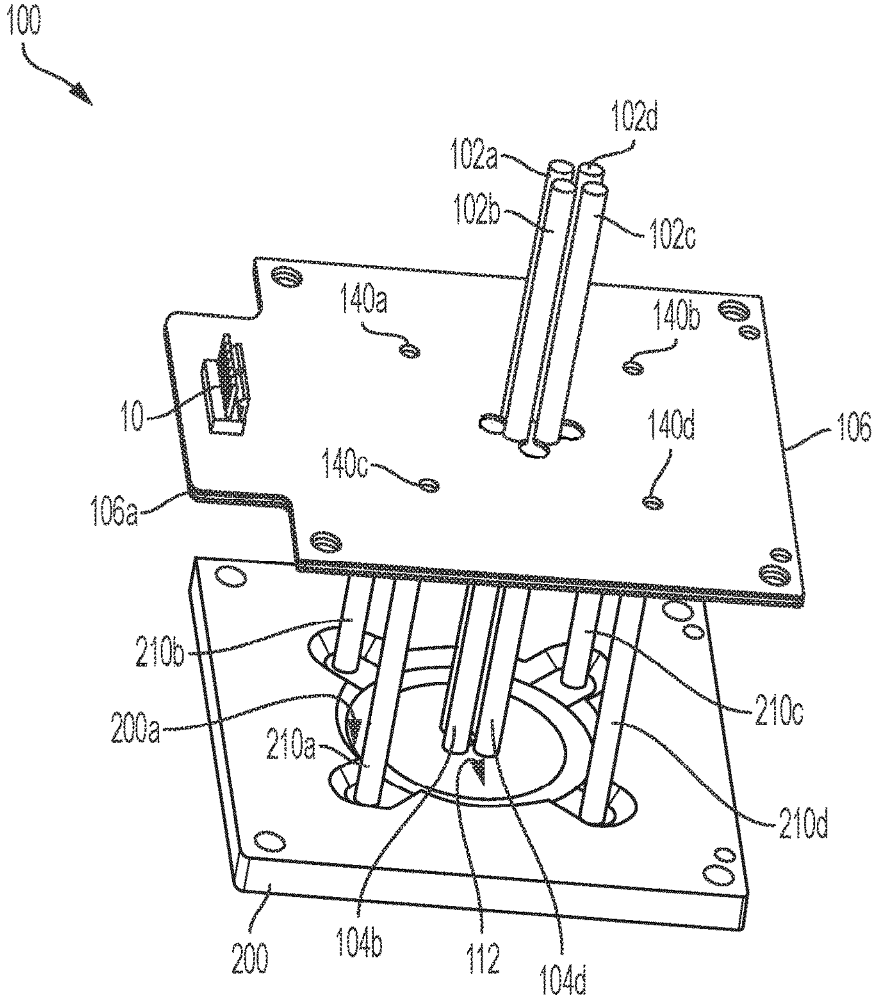
FIG. 1 schematically depicts an integrated ion guide assembly according to an embodiment of the present teachings.

The present teachings provide an integrated ion guide assembly suitable for use in a variety of mass spectrometers, which integrates two sets of multipole rods within the same unit. In many embodiments, the two sets of multipole rods are directly pairwise coupled to one another through openings provided in a board via a plurality of connectors (e.g., threaded metal rods, e.g., via male-to-female or male-to-male connections). In some embodiments, the rods of the two multipole rod sets are connected together such that the pressure exerted on the base of the rods compresses them into a lens (herein referred to as IQ0 lens) provided in the board and allows for simultaneous sealing, alignment and electrical connectivity. In some embodiments, the rods have a small machined steps at their ends, which facilitate seating and aligning the rods into copper plated through holes in the board, which can be formed, e.g., of Rogers material.

As discussed in more detail below, an integrated ion guide assembly according to the present teachings can include another ion lens (herein referred to as IQ1 lens) that is seated in a recess provided in a substrate that is positioned downstream of the board. In some embodiments, a plurality of electrical traces (herein also referred to as feedthroughs) provided in the board can allow application of voltages to the IQ1 lens via a plurality of conductive (metal) rods coupled at one end to those traces and at another end to the IQ1 lens. In some embodiments, such conductive rods can provide not only electrical connections for the IQ1 lens but they can also serve to locate the lens in the IQ1 holder, apply pressure to the lens for sealing and help accurately space the IQ1 lens from the ends of the Q0 rods.

An integrated ion guide assembly according to the present teachings allows for the removal of the entire QJet/IQ0/Q0/IQ1 assembly as one unit. As discussed in more detail below, this provides a number of advantages. For example, in one embodiment, the integrated ion guide assembly can be formed as a disposable unit that can be discarded after use, rather than being cleaned and reused.

Various terms are used herein in accordance with their ordinary meanings in the art. The term "about" as used herein indicates a variation of at most 5% around a numerical value. The term "substantially" as used herein indicates a variation relative to a complete state or condition that is at most 5%.

With reference to FIGS. 1, 2, 3, 4, 5, 6, 7, 8, 9A, 9B, 10A, 10B, 11, 12, and 13, an integrated ion guide assembly 100 according to an embodiment for use in a mass spectrometer includes a first plurality of multipole rods 102*a*, 102*b*, 102*c*, and 102*d* (herein also referred to collectively as rods 102 or QJet rods) and a second plurality of multipole rods 104*a*, 104*b*, 104*c*, and 104*d* (herein also referred to collectively as rods 104 or Q0 rods) that are pairwise aligned and coupled to one another through a board 106, as discussed in more detail below. In this embodiment, each of the QJet and Q0 rods extends from a proximal end (PE) to a distal end (DE).

In this embodiment, the QJet and Q0 rods are positioned relative to one another in a quadrupole configuration, where the internal space between the rods provides a passageway for transit of ions therethrough. Further, in this embodiment, the QJet and Q0 rods have substantially identical diameters and internal spacings between the rods. As discussed in more detail below, the application of radio frequency (RF) and direct current (DC) voltages to the QJet and Q0 quadrupole rods allows generating a narrow and highly focused ion beam for transmission to components of the mass spectrometer that are positioned downstream of the integrated ion guide assembly 100. In some embodiments, the QJet and Q0 rods can be substantially cylindrical with a diameter in a range of about 2 mm to about 10 mm.

The board 106 includes a plurality of openings 108*a*/108*b*/108*c*/108*d* (herein collectively referred to as openings 108) through which the QJet rods can be coupled to the Q0 rods. By way of example, in this embodiment, a plurality of connectors 109*a*/109*b*/109*c*/109*d* (herein collectively referred to as connectors 109) extend between the distal ends of the QJet rods and the proximal ends of the Q0 rods through the openings 108 in the board for physically connecting the QJet rods to the Q0 rods. A variety of connectors can be employed. By way of example, in some embodiments, the connectors are electrically conductive while in other embodiments the connectors are non-conductive (electrically insulating). For example, in some embodiments, threaded metallic screws (e.g., formed of stainless steel, aluminum, copper or other suitable metals) can be employed.

Figure 5:
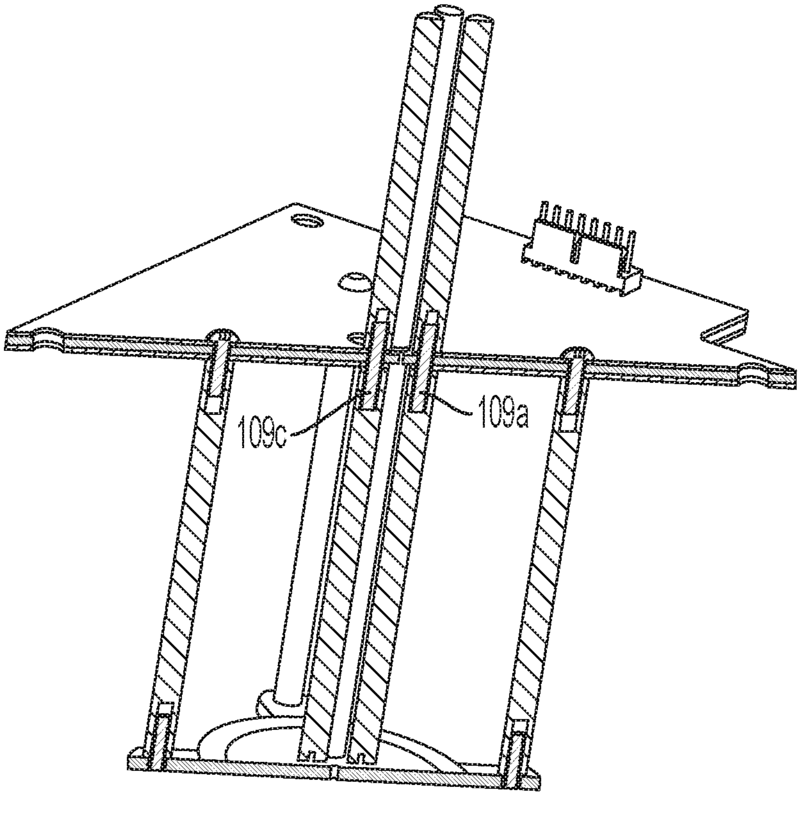
FIG. 5 is a partial cut-away view of the ion guide assembly depicted in FIG. 1.
Figure 6:
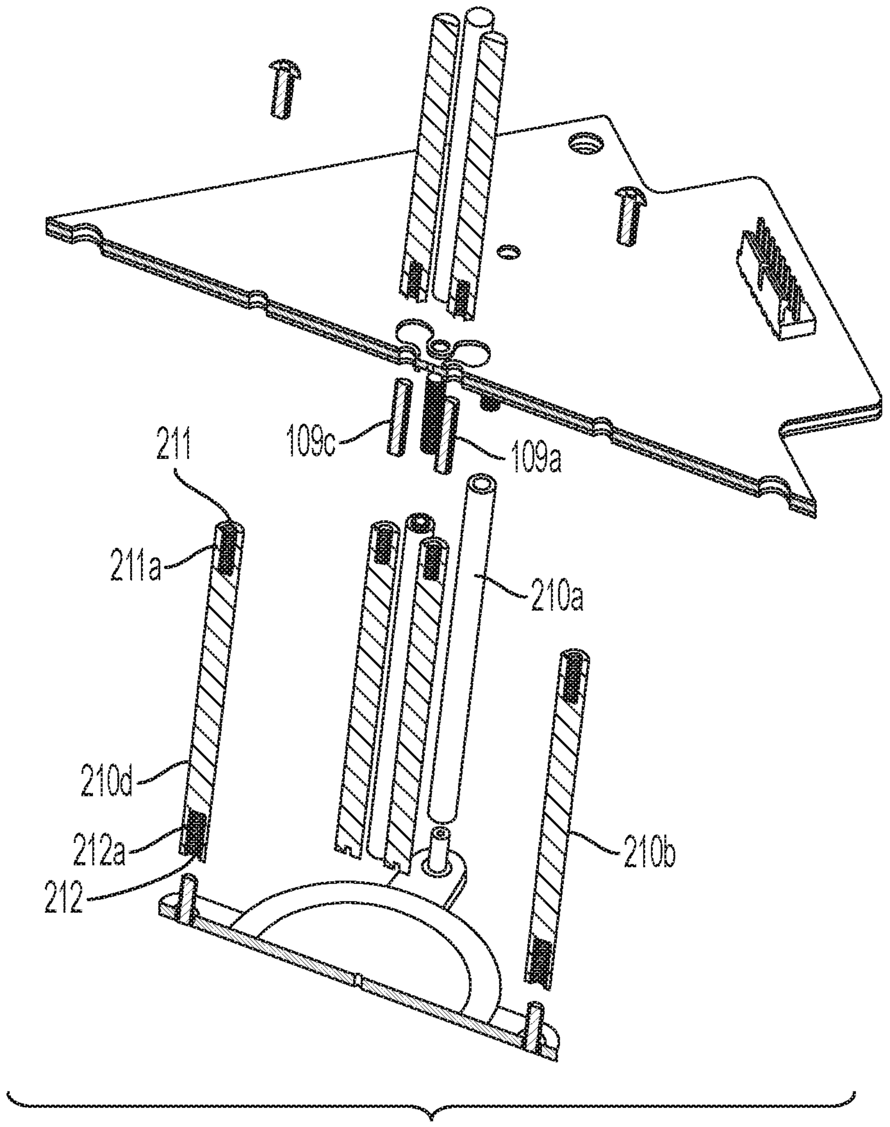
FIG. 6 is a partial exploded cut-away view of the ion guide assembly of FIG. 1.
Figure 7:
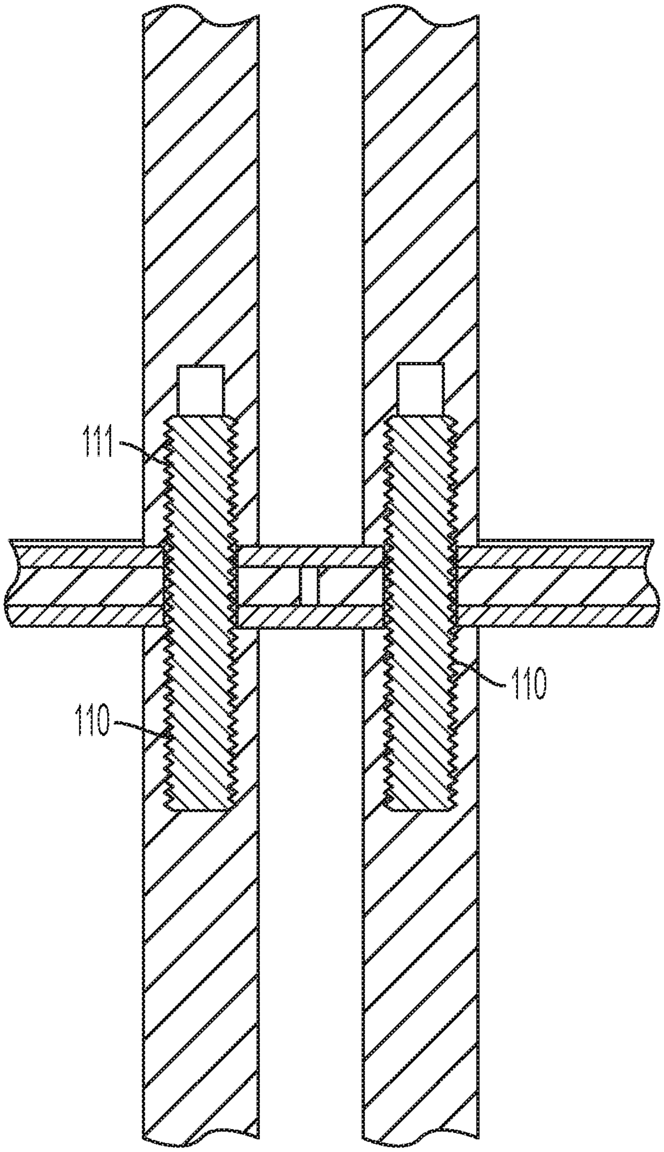
FIG. 7 is a schematic cross-sectional view of two rods of each of the first and second multipole rods employed in an ion guide assembly according to an embodiment and two connectors that pairwise connect the rods of the first set to the rods of the second set, FIG. 8 schematically depicts that a board employed in an ion guide assembly according to the present teachings through which first and second sets of multipole rods are connected to one another can be formed in some embodiments of a plurality of layers, FIGS. 9A and 9B schematically depict electrical traces provided in the board for applying voltages to an ion lens incorporated in the board.

With reference to FIGS. 5, 6, and 7, in this embodiment, the connectors 109 are in the form of posts having ends with external threads 110 that engage with internal threads in openings 111 provided in the distal ends and the proximal ends, respectively, of the QJet and Q0 rods for physically coupling the QJet rods to the Q0 rods. While in this embodiment the connectors provide a male-to-female connection, in other embodiments, the connectors can provide female-to-female connection. In some embodiments, the threaded rods can be built into at least one of the QJet or Q0 rods and can provide male-to-female connection.

As discussed below, in some embodiments, electrically conductive connectors are employed, which allow applying the same RF and/or DC voltages to the QJet and Q0 rods using the same RF and/or DC source. By way of example, in some such embodiments, the conductive connectors ensure that the application of a voltage (e.g., a DC and/or RF voltage) to one set of rods (e.g., QJet) rods results in the other set of rods being at the voltage as well. In other embodiments, the connectors can be electrically insulating so as to allow the application of different RF and/or DC voltages to the QJet and Q0 rods.

Figure 8:
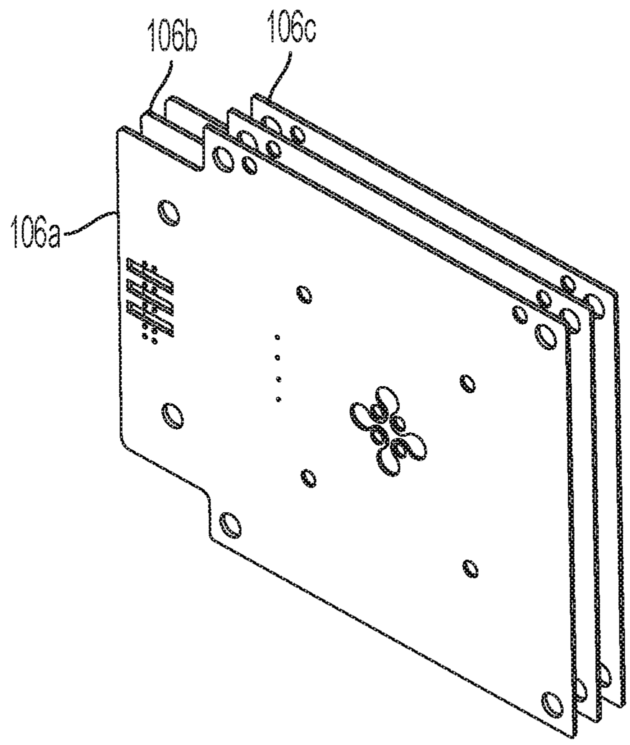
Figure 9B:
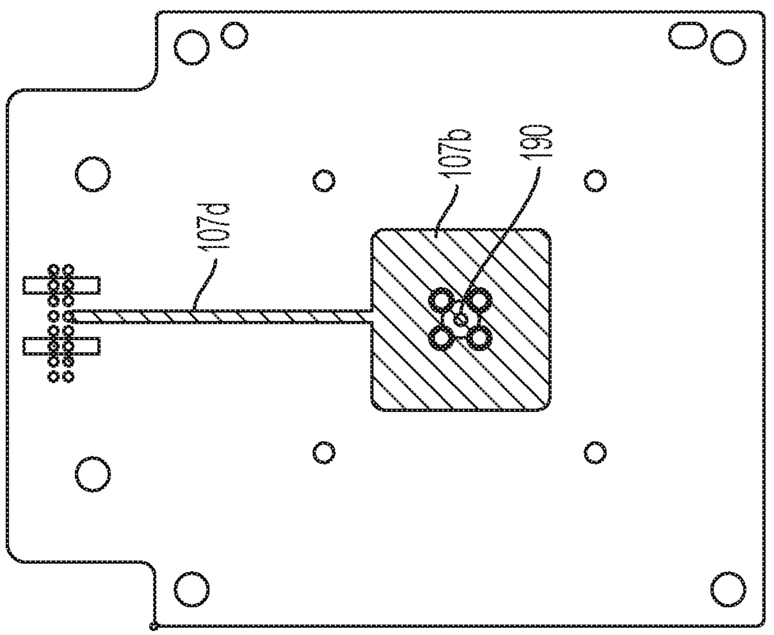
Figure 9A:
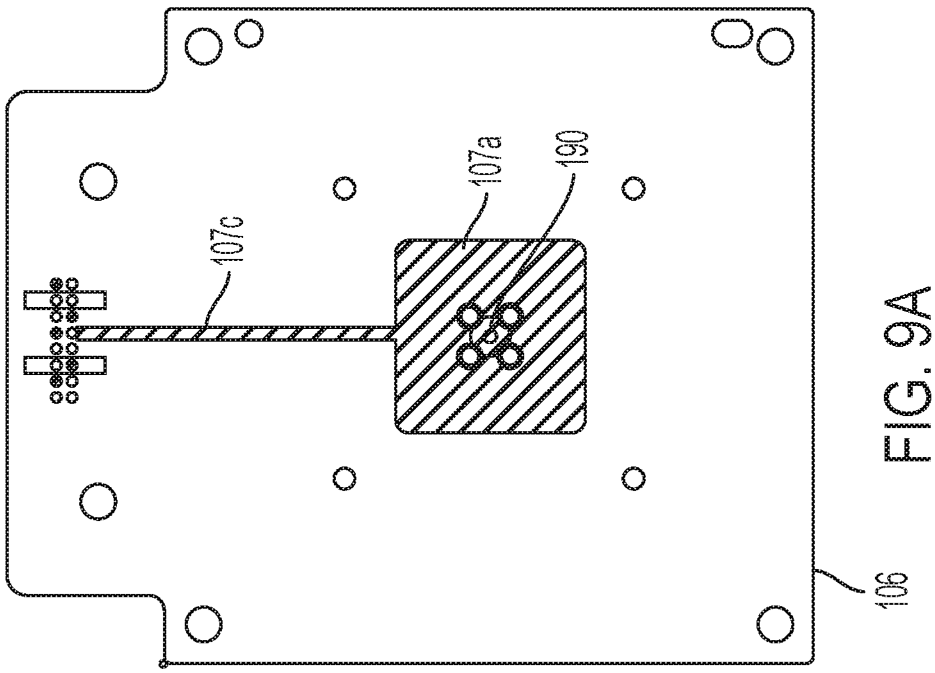

With reference to FIG. 8, the board 106 can be made of a plurality of layers, e.g., three layers in this embodiment, including an outer layer 106*a*, a middle layer 106*b*, and an inner layer 106*c*. As shown in FIGS. 9A and 9B, in this embodiment, an ion lens 107 (herein also referred to as IQ0 lens) is disposed in the middle layer of the board. The ion lens 107 includes a conductive front surface 107*a* and a conductive back surface 107*b*. Two electrical traces 107*c* and 107*d* electrically couple the front and back surfaces of the ion lens 107 to two pins of a connector 10 provided on the front layer of the board to allow the application of a voltage differential to the front and back conductive surfaces of the ion lens 107. The ion lens 107 includes a plated aperture 109 (which can be plated, e.g., with gold, enig (nickel immersion gold), copper), which allows the passage of the ions therethrough.

The various layers of the board can be formed of a variety of suitable polymeric materials. For example, the board can be formed of FR4, Rogers material, and/or a prepreg material.

In some embodiments, the board can be configured to provide a seal between a chamber in which the QJet rods are disposed and another chamber in which the Q0 rods are disposed. For example, in this embodiment, the board 106 includes a peripheral smooth gold surface with which an O-ring that is seated within a groove provided in a housing of a vacuum chamber mates to seal the two chambers (i.e., the chamber in which the QJet rods and Q0 rods are positioned) relative to one another.

Figure 11:
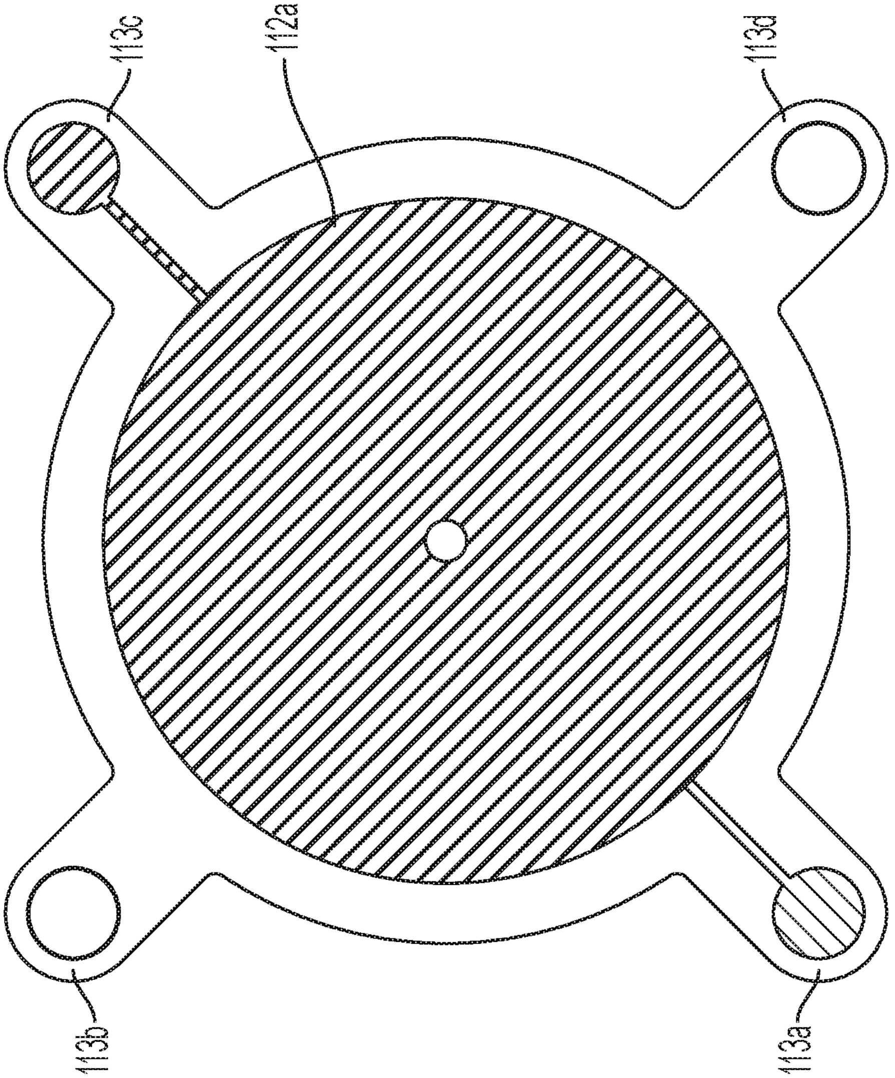
Figure 12:
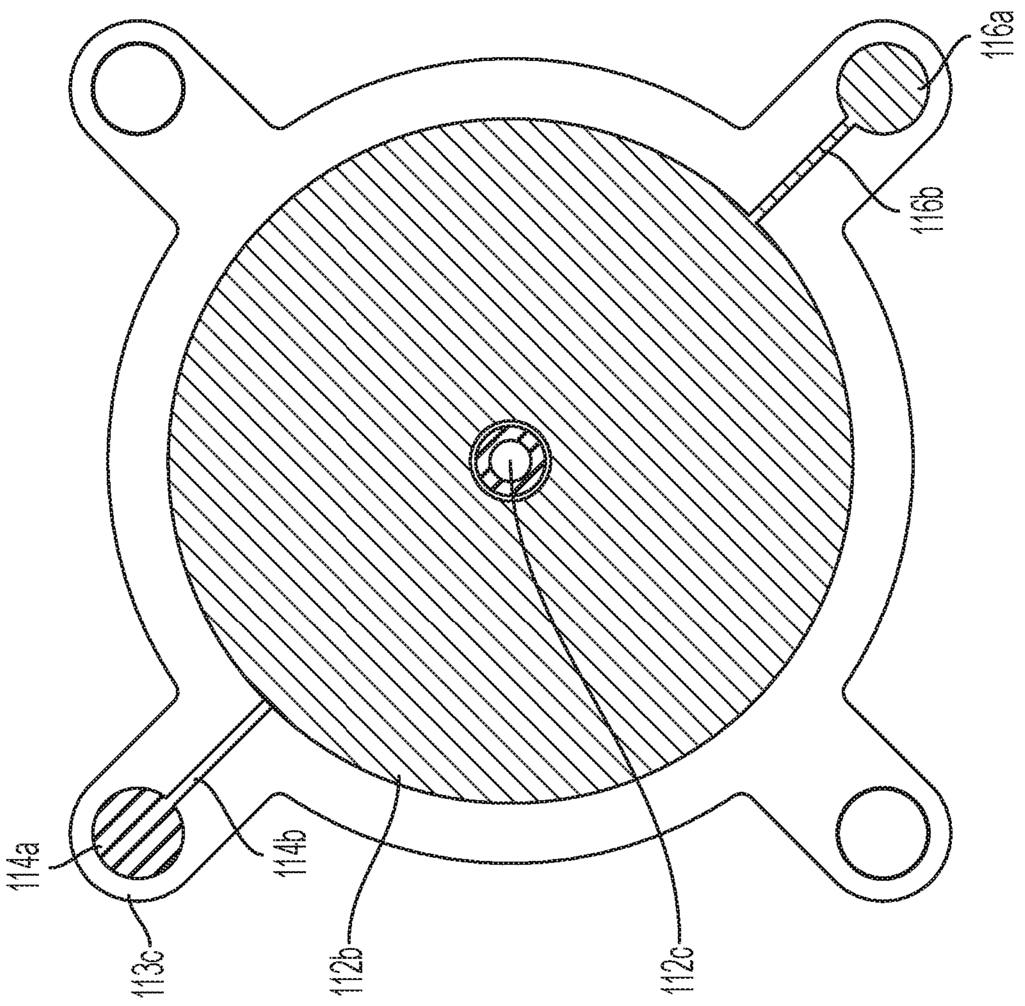
Figure 13:
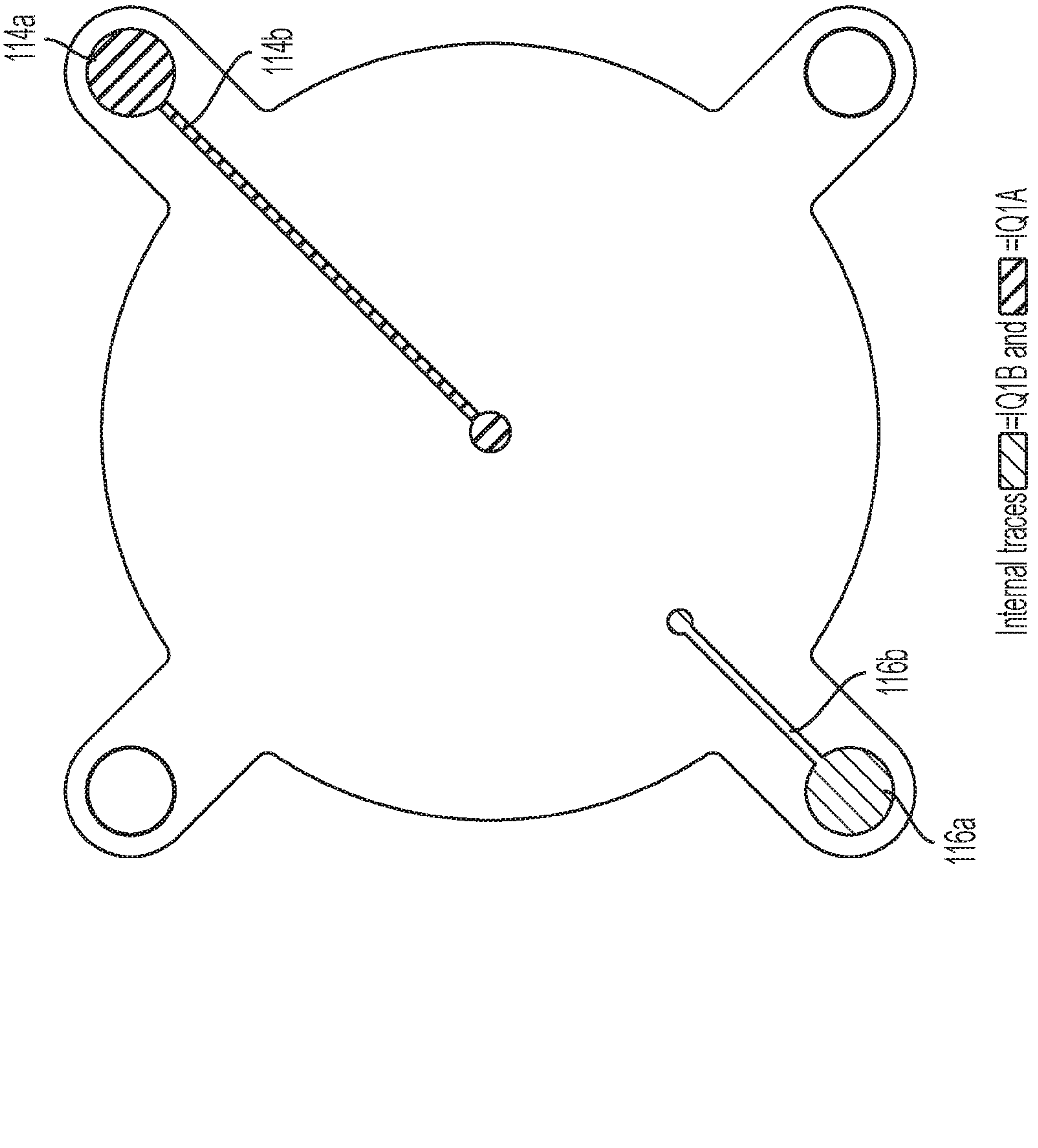

Another ion lens 112 (herein also referred to as IQ1 lens) is disposed downstream of the board 106 to focus the ions passing through the Q0 region (i.e., the volume enclosed by the Q0 rods) as they enter regions of a mass spectrometer positioned downstream of the Q0 region. With reference to FIGS. 11, 12, and 13, the ion lens 112 includes a front conductive surface 112*a* and a back conductive surface 112*b* and an aperture 112*c* through which ions pass through the lens. Further, the ion lens 112 includes a plurality of lateral extensions 113*a*, 113*b*, 113*c*, and 113*d* (herein collectively referred to as lateral extensions, wings or tabs 113).

With continued reference to FIGS. 11, 12, and 13, an electrically conductive element 114*a* is disposed on the tab 113*c* that is electrically coupled to a conductive radial trace 114*b*, which is in turn electrically coupled to the conductive front surface 112*a* of the ion lens 112. Similarly, an electrically conductive element 116*a* is disposed on the tab 113*a* that is electrically coupled to a radial extension 116*b*, which is in turn electrically coupled to the conductive back surface 112*b* of the ion lens 112. RF and/or DC voltages can be applied via the connectors and electrical traces 114*a*/114*b*/116*a*/116*b* to the conductive front and back surfaces of the ion lens 112 to energize the ion lens for focusing the ions passing through its aperture.

Figure 10B:
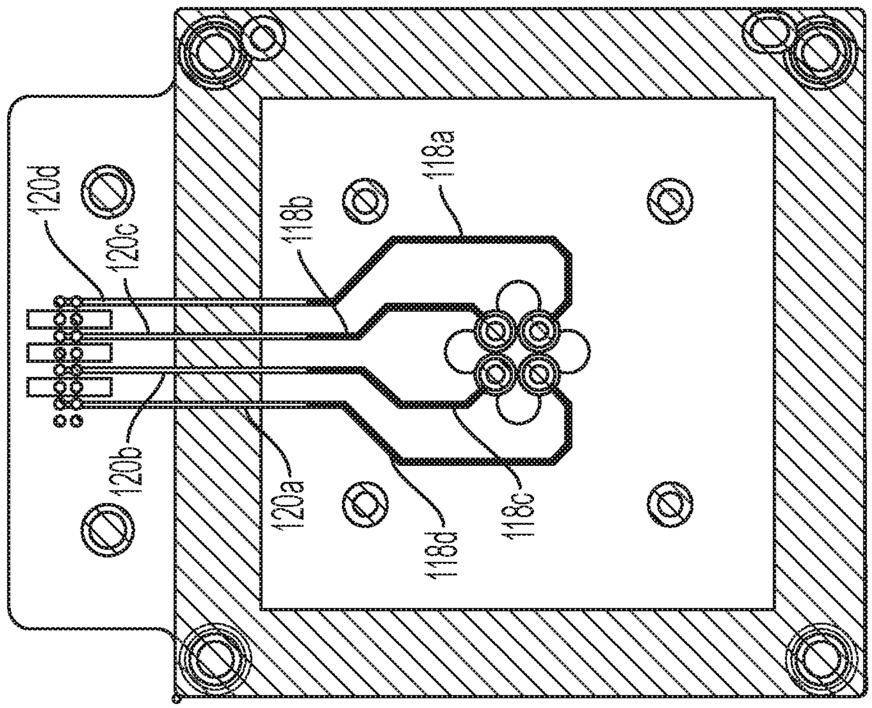
FIG. 10B shows electrical traces provided in the board for applying voltages to the multipole rod sets, FIG. 11 schematically depicts the front surface of the IQ1 lens, FIG. 12 schematically depicts the back surface of the IQ1 lens, FIG. 13 schematically depicts internal electrical traces employed to apply voltages to the conductive surfaces of the IQ1 lens, FIG. 14A schematically depicts an ion guide assembly according to another embodiment of the present teachings.
Figure 10A:
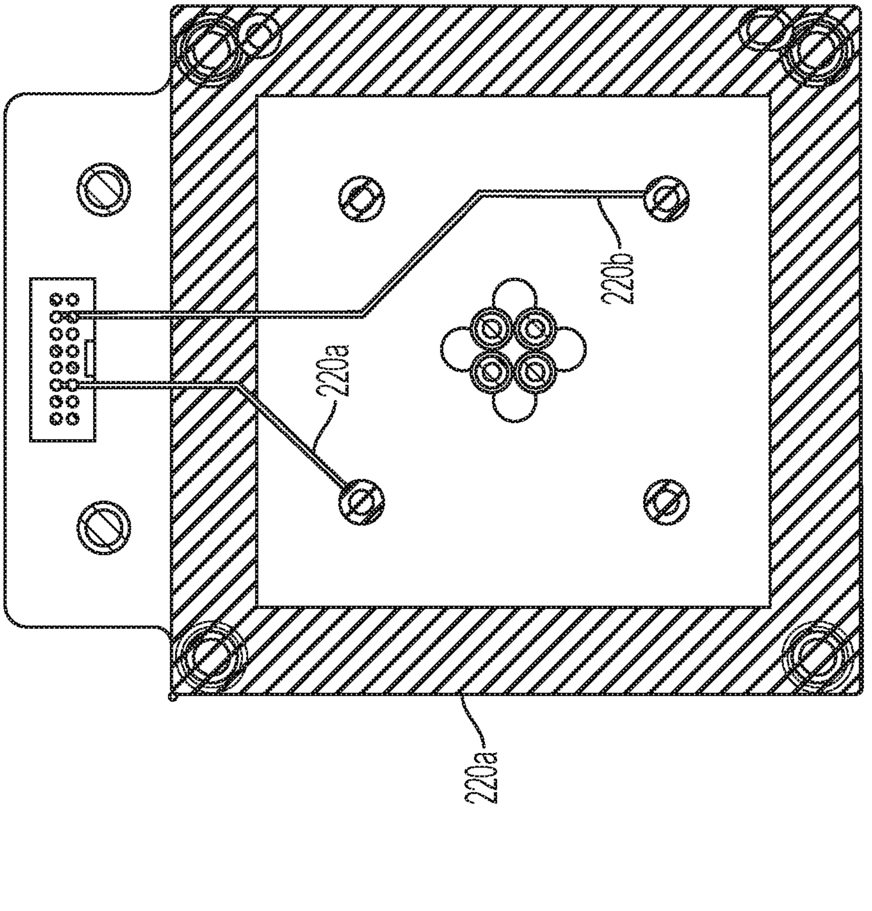
FIG. 10A shows electrical traces provided in the board for applying voltages to an ion lens incorporated in a substrate positioned downstream of the board via a pair of electrically conductive rods.

Referring now to FIGS. 10A and 10B, the front layer 106*a* of the board 106 includes a plurality of electrical traces 118*a*, 118*b*, 118*c*, and 118*d* (herein collectively referred to as electrical traces 118) that are electrically coupled to inside electrical traces 120*a*, 120*b*, 120*c*, and 120*d* (herein collectively referred to as inner traces 120), which are in turn coupled to pins of the electrical connector 10 for receiving voltages (e.g., RF and/or DC voltages) and transmitting those voltages to the QJet rods 102. In some embodiments in which the connectors 109 coupling the QJet rods 102 to Q0 rods 104 are electrically conductive, these connectors transmit the applied voltage(s) to the Q0 rods 104.

With reference to FIG. 1, the ion lens 112 is seated in a tapered clover leaf shaped recess 200*a* provided in the substrate 200, which houses a sealing O-ring against which the IQ1 lens can be positioned.

As shown, for example, in FIGS. 1, 2, 3, and 4, a plurality of connecting rods 210*a*/210*b*/210*c*/210*d* (which are herein collectively referred to as connecting rods, or extension rods or standoffs 210) physically connect the board 106 to the ion lens 112, and hence the substrate 200 in which the ion lens 112 is positioned. Each of the connecting rods 210 extends from a proximal end (PE) to a distal end (DE). Further, each connecting rod 210 includes openings having internal threads at each of its proximal and distal ends (such as openings 211 and 212 and the respective internal threads 211*a* and 211*b*) for engaging with a fastener (e.g., a screw), as discussed in more detail below.

Figure 2:
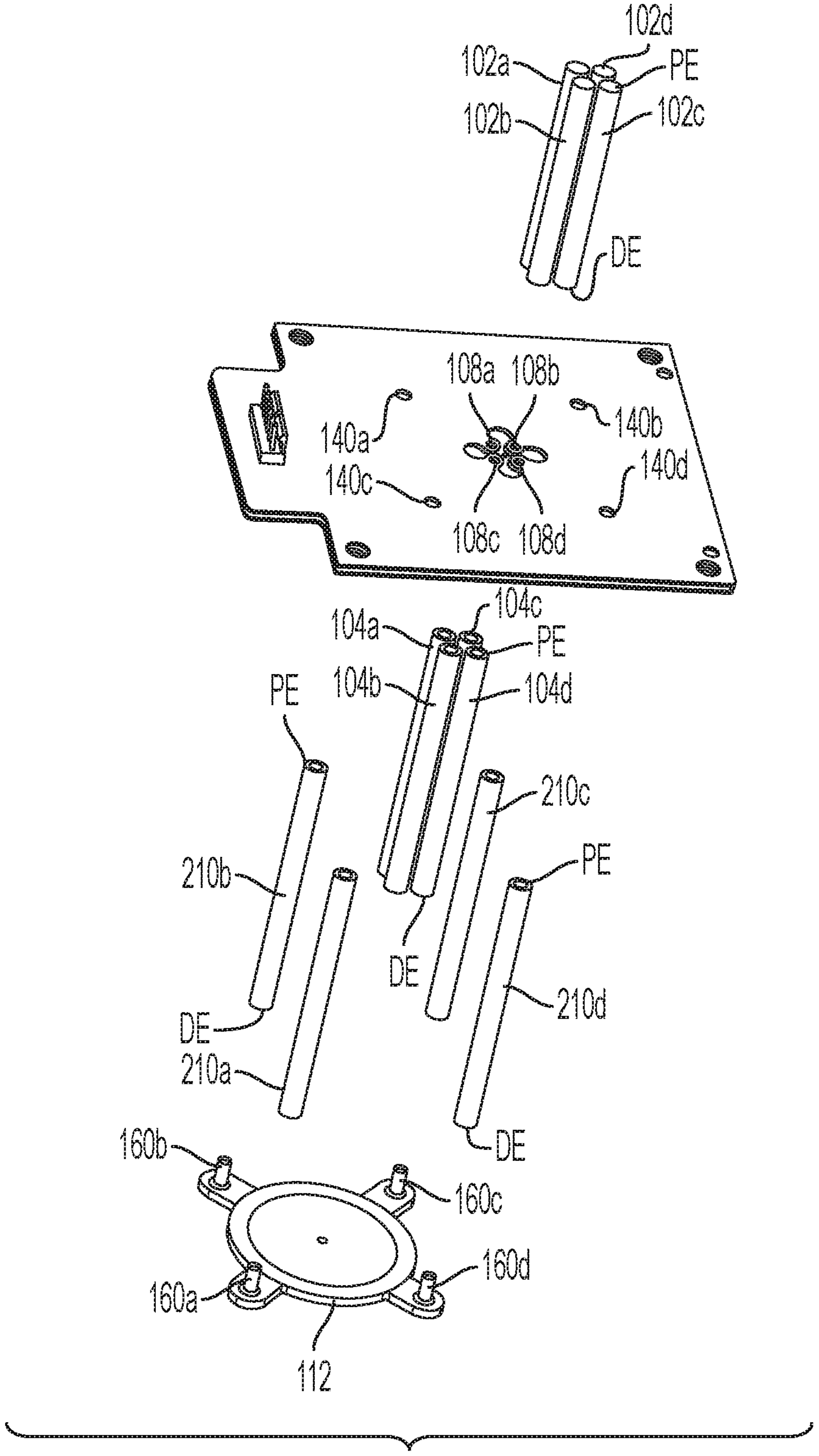
FIG. 2 is an exploded partial schematic view of the integrated ion guide assembly depicted in FIG. 1.
Figure 3:
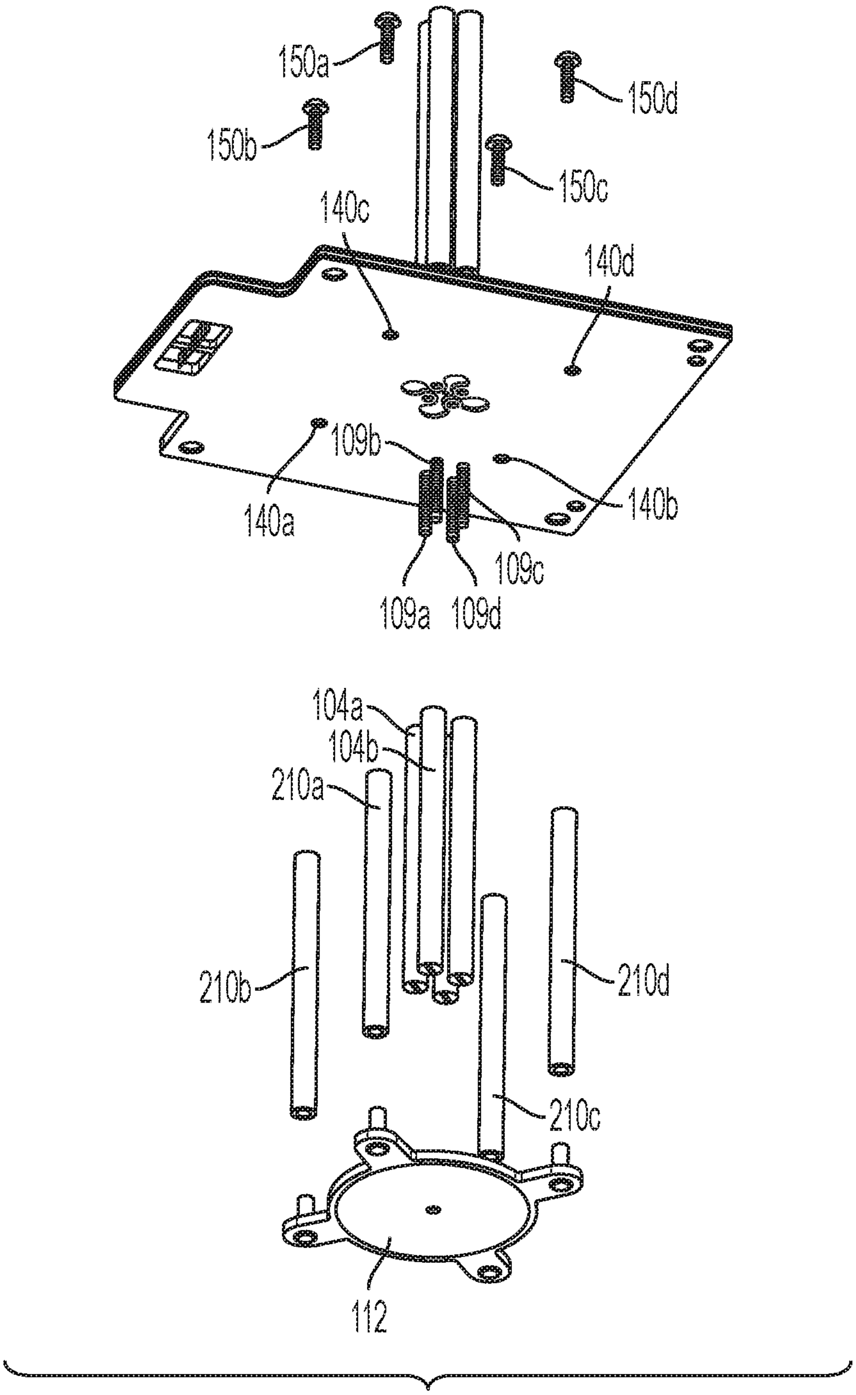
FIG. 3 is another exploded partial schematic view of the integrated ion guide assembly depicted in FIG. 1.

As shown, for example, in FIGS. 1, 2, and 3, a plurality of openings 140*a*/140*b*/140*c*/140*d* (herein collectively referred to as openings 140) are provided in the plate 106 through which a plurality of connecting screws 150*a*/150*b*/150*c*/150*d* (herein referred to collectively as connecting screws 150) having external threads can engage with the internal threads provided at the proximal ends of the connecting rods 210 so as to secure these rods to the board 106.

Figure 4:
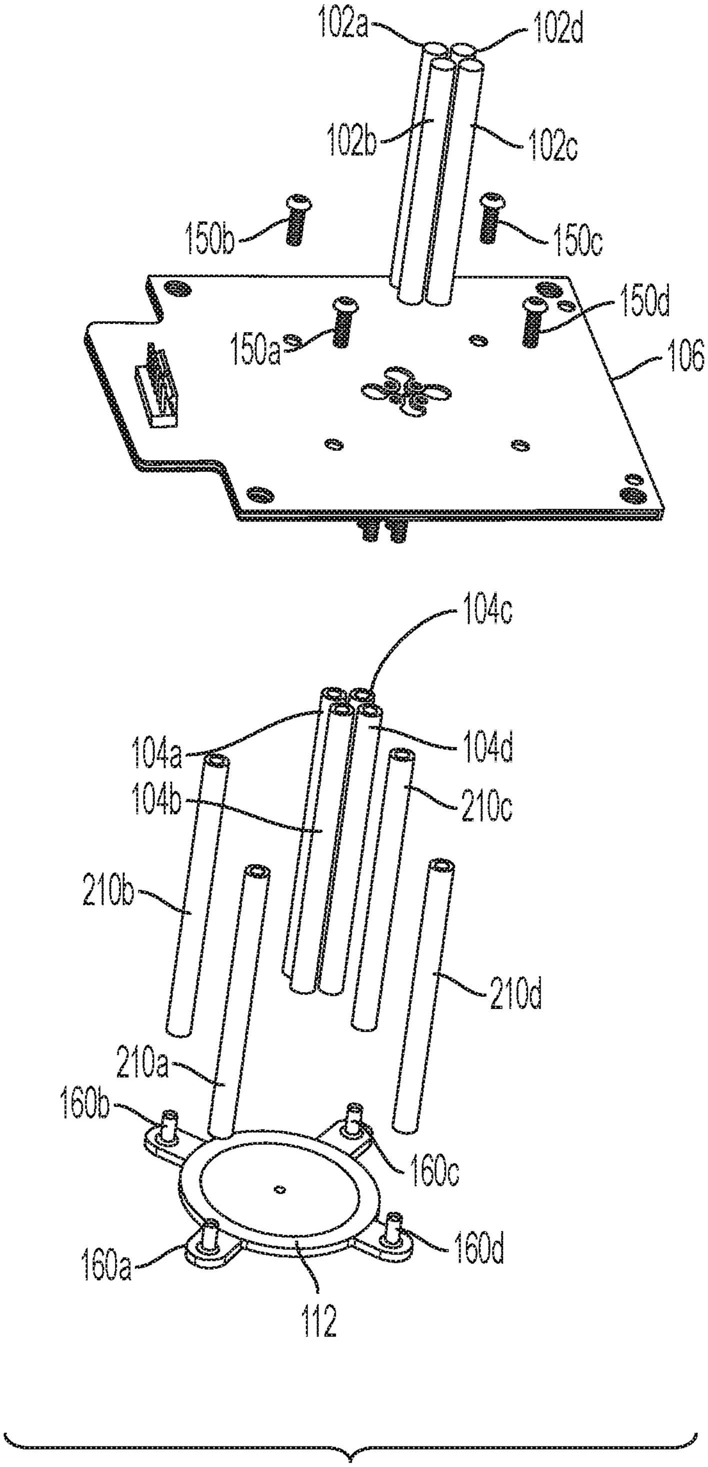
FIG. 4 is another exploded partial schematic view of the integrated ion guide assembly depicted in FIG. 1.

Further, as shown in FIGS. 2, 3, and 4, a plurality of externally threaded metal connectors 160*a*/160*b*/160*c*/160*d* (herein referred to collectively as threaded connectors 160) are disposed on the tabs 113 of the IQ1 lens 112, which can engage with the internal threads provided at the distal ends of the connecting rods 210, thereby physically connecting the board 106 with the lens 112. The rods 210 can apply pressure to each of the tabs 113 on the IQ1 lens to provide a sealing force. In some embodiments, the rods 210 are long enough (e.g., in a range of about 65 mm to about 110 cm) so as to load the tabs with about 300-500 micron of deflection so as to facilitate sealing of the IQ1 lens. The tabs can have machined recesses behind them such that they effectively act as springs.

In this embodiment, the separation of the board 106 from the substrate 200 is such that the distal ends of the quadrupole rods 104 are positioned within a few millimeters of the top conductive surface of the ion lens 112.

In this embodiment, at least two of the connecting rods 210 are formed of an electrically conductive material to transmit voltages to the conductive surfaces of the IQ1 lens via the threaded metal connectors 160 and metal traces provided in the substrate 200. More specifically, with reference to FIG. 10A, two electrically conductive traces 220*a*/220*b* can receive voltages from two pins of the electrical connector 10 and apply those voltages via connecting rods 210*a* and 210*c* (which can be conductive or at least have a conductive core or shell) to the connecting elements 113*a* and 113*c* on the wings of the IQ1 lens, which can in turn apply those voltages to the front and back conductive surfaces of the IQ1 ion lens. Hence, in this embodiment, the connecting rods 210*a* and 210*c* provide both a structural function and an electrical function.

The ion guide assembly 100 provides a modular unit in which both the QJet and Q0 rods and their associated ion lenses are incorporated. Such an integrated unit can reduce the complexity and the cost associated with the QJet and Q0 rods and associated lenses in conventional mass spectrometers. Further, in some embodiments, the ion guide assembly 100 can be made at such a low cost that the assembly can be fabricated as a single-use disposable item. This can reduce the cost and complexity associated with periodic cleaning of the rods and the ion lenses.

Figure 14A:
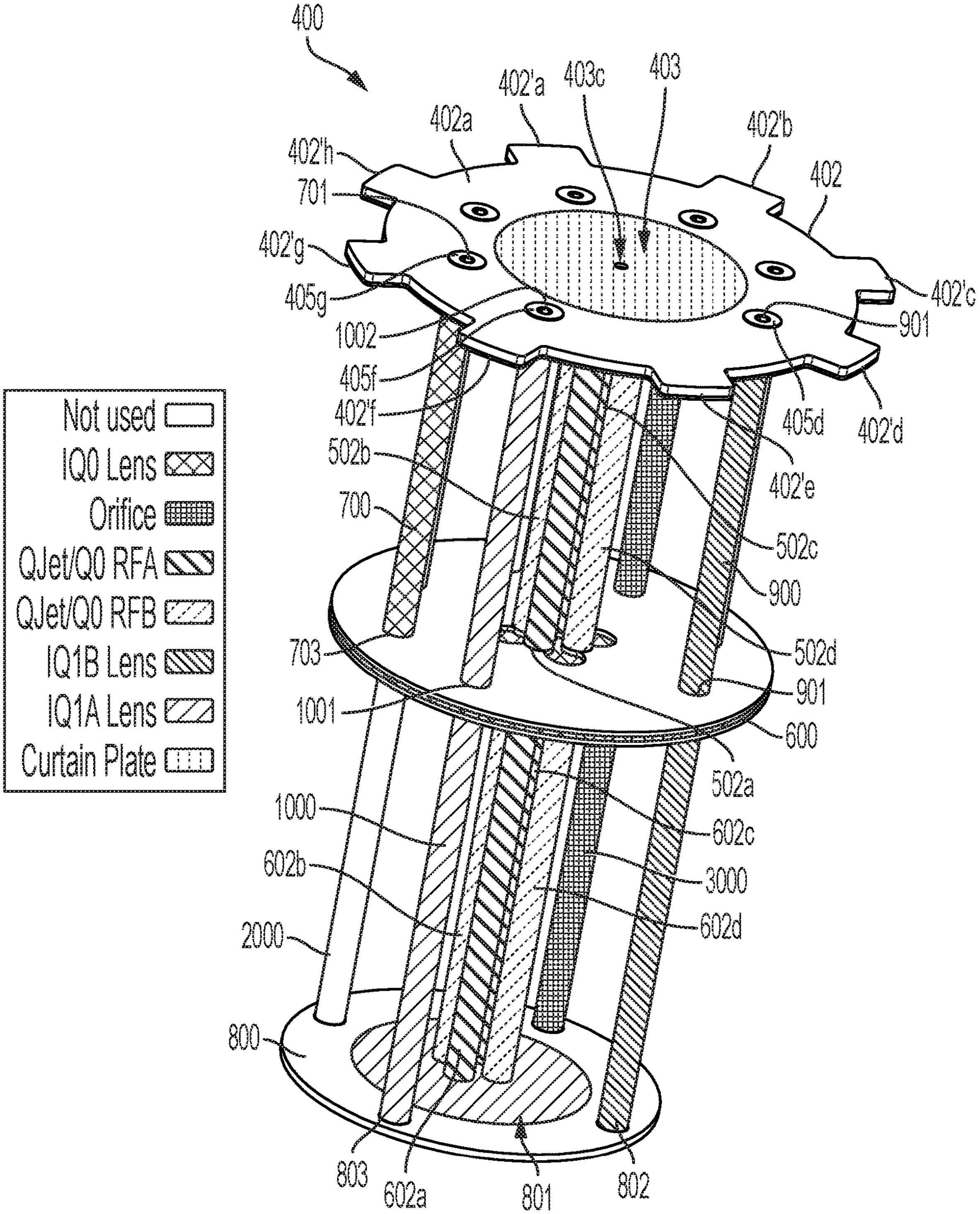
FIG. 14B is another schematic view of the ion guide assembly shown in FIG. 14A.
FIG. 14C is a cross-sectional view of the ion guide assembly depicted in FIG. 14A.
FIG. 14D is a schematic view of the front face of an orifice plate employed in the ion guide assembly shown in FIGS. 14A and 14B.
FIG. 14E is a partial schematic view of the ion guide assembly shown in FIG. 14A, depicting the two sets of multipole rods employed in the QJet and Q0 regions, FIG. 14F schematically depicts the back face of the orifice plate, FIG. 14G schematically depicts the front face of the orifice plate.
Figure 14B:
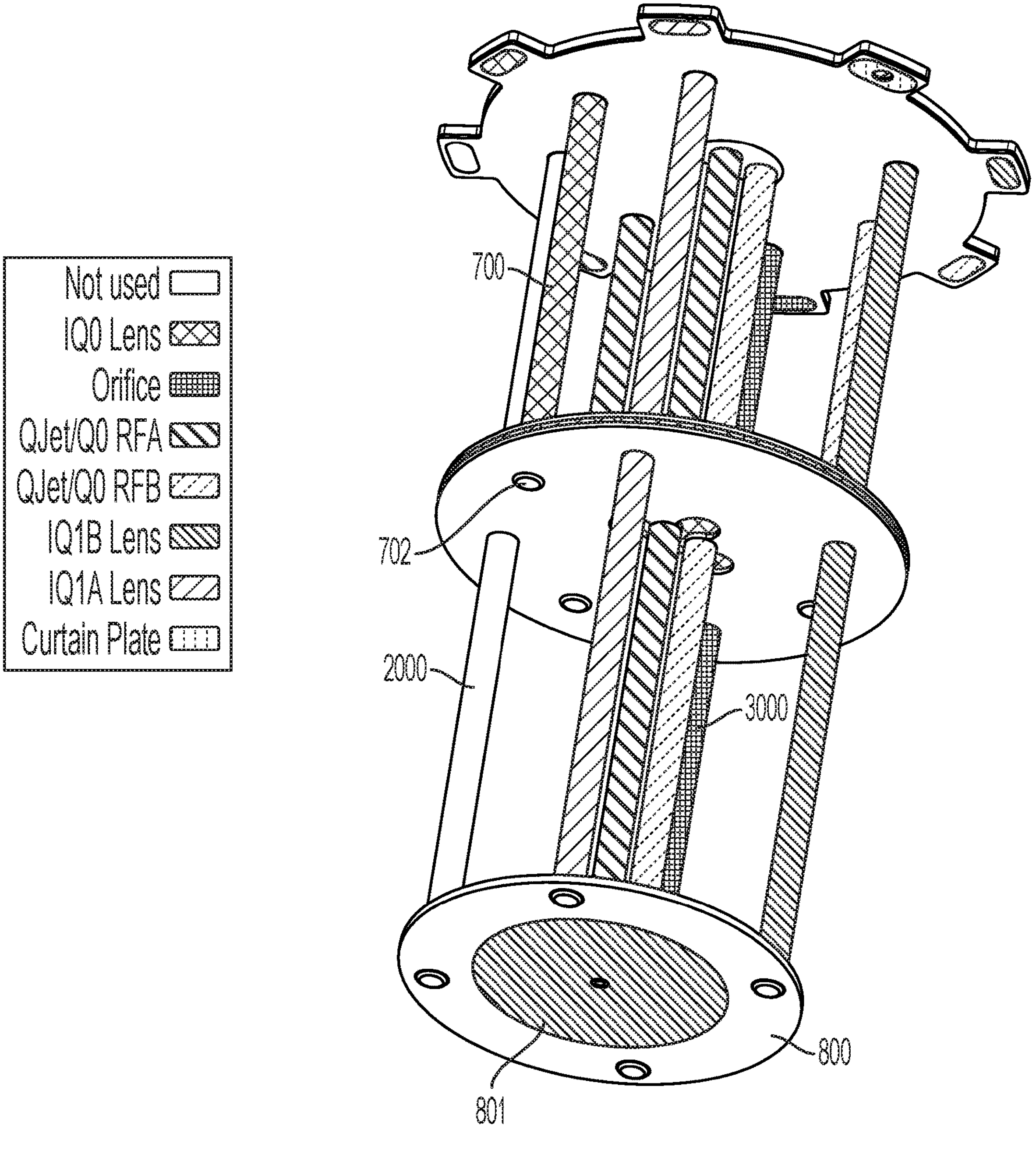
Figure 14C:
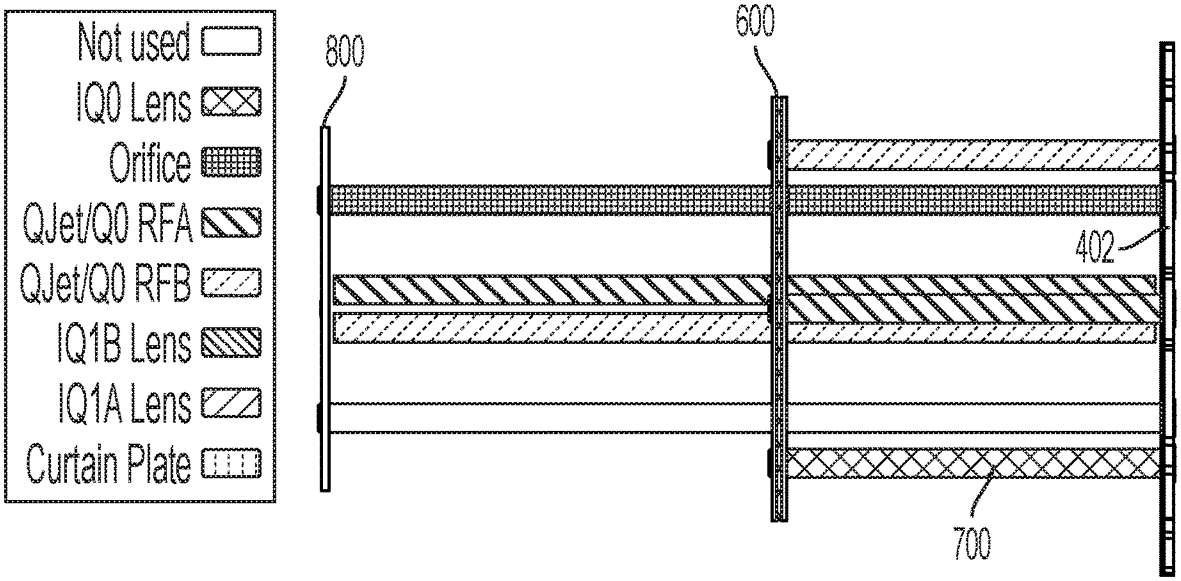
Figure 14D:
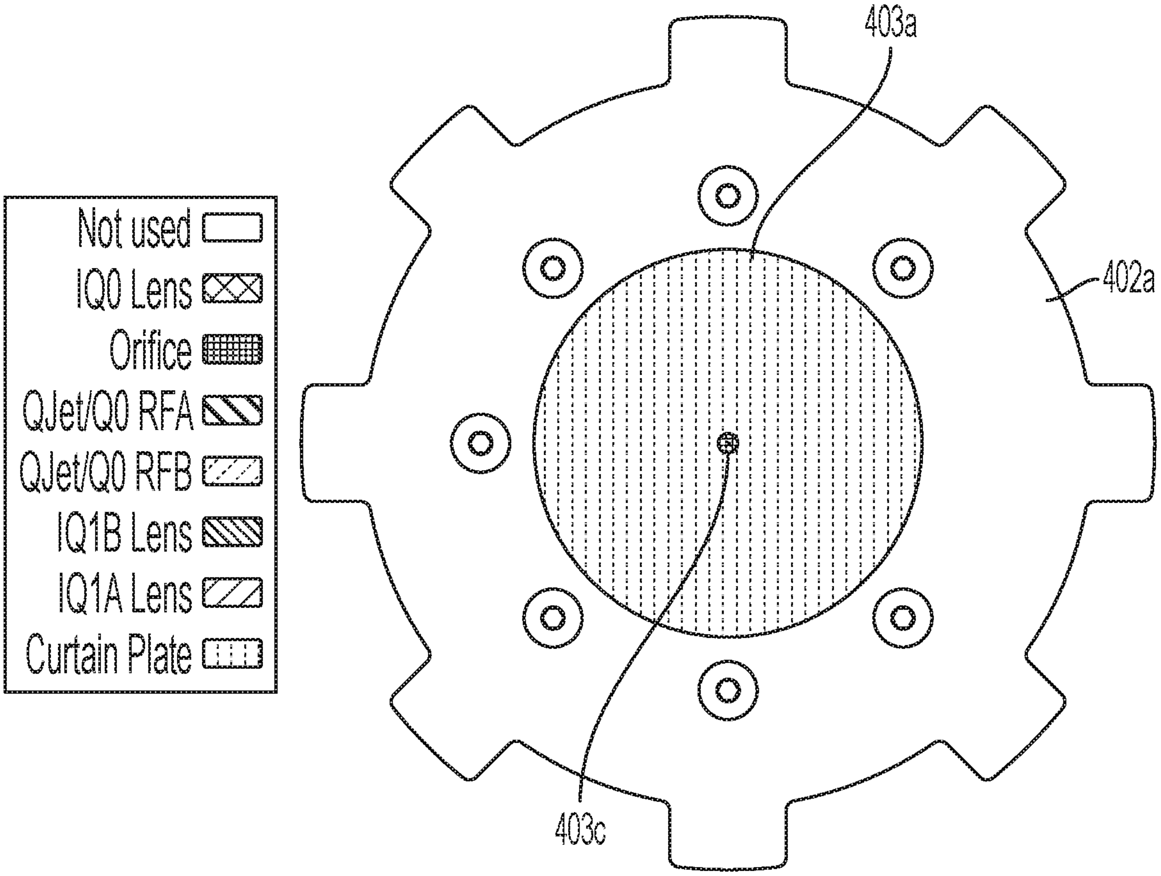
Figure 14E:
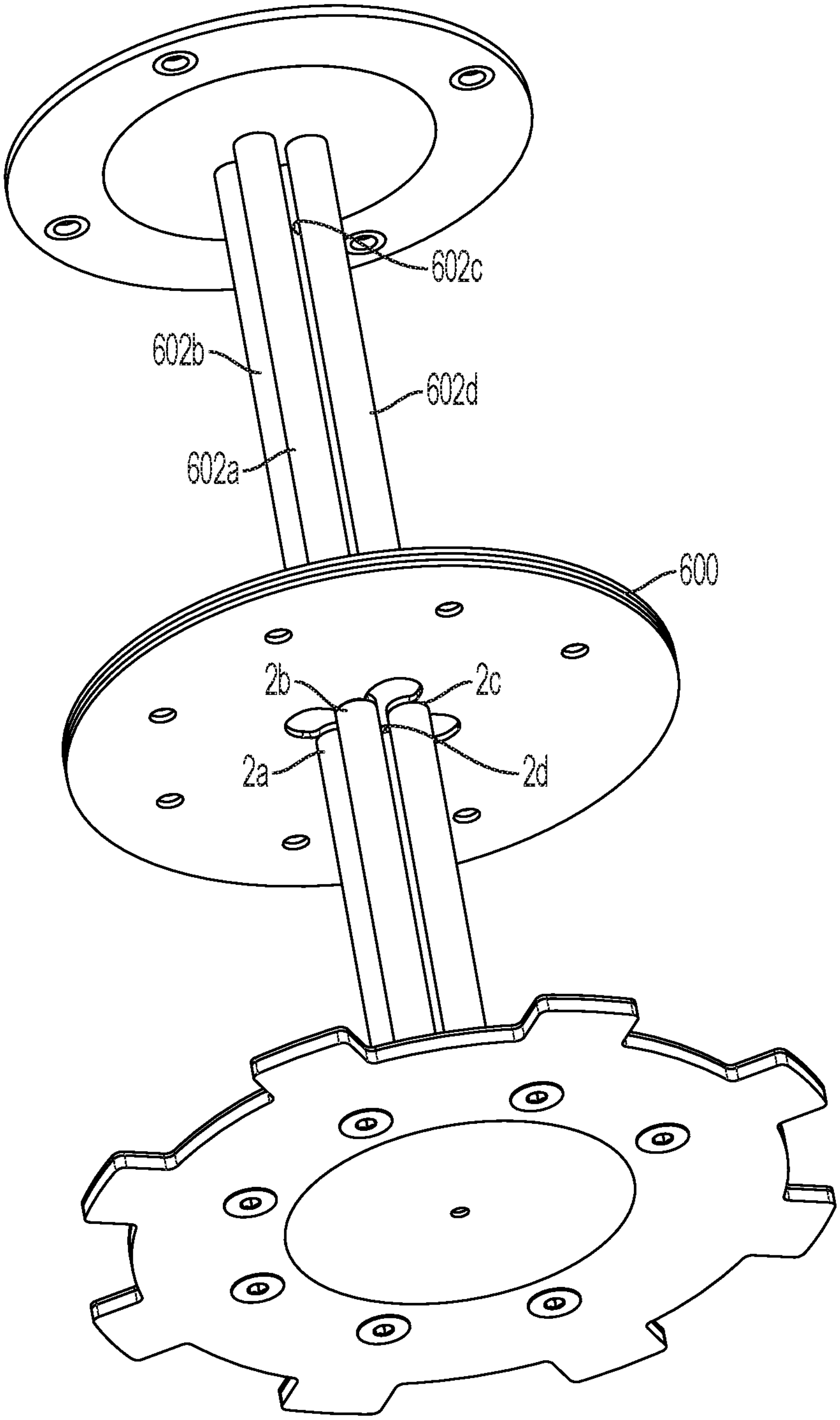
Figure 14F:
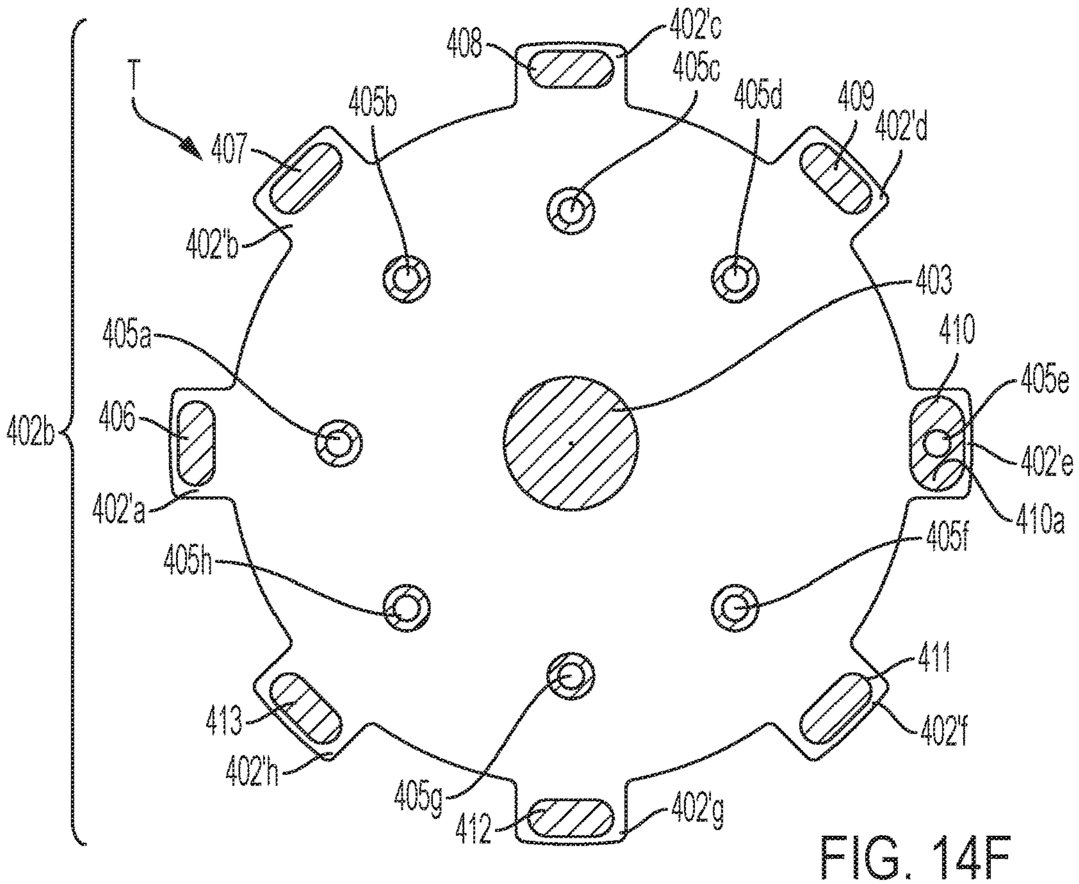
Figure 14G:
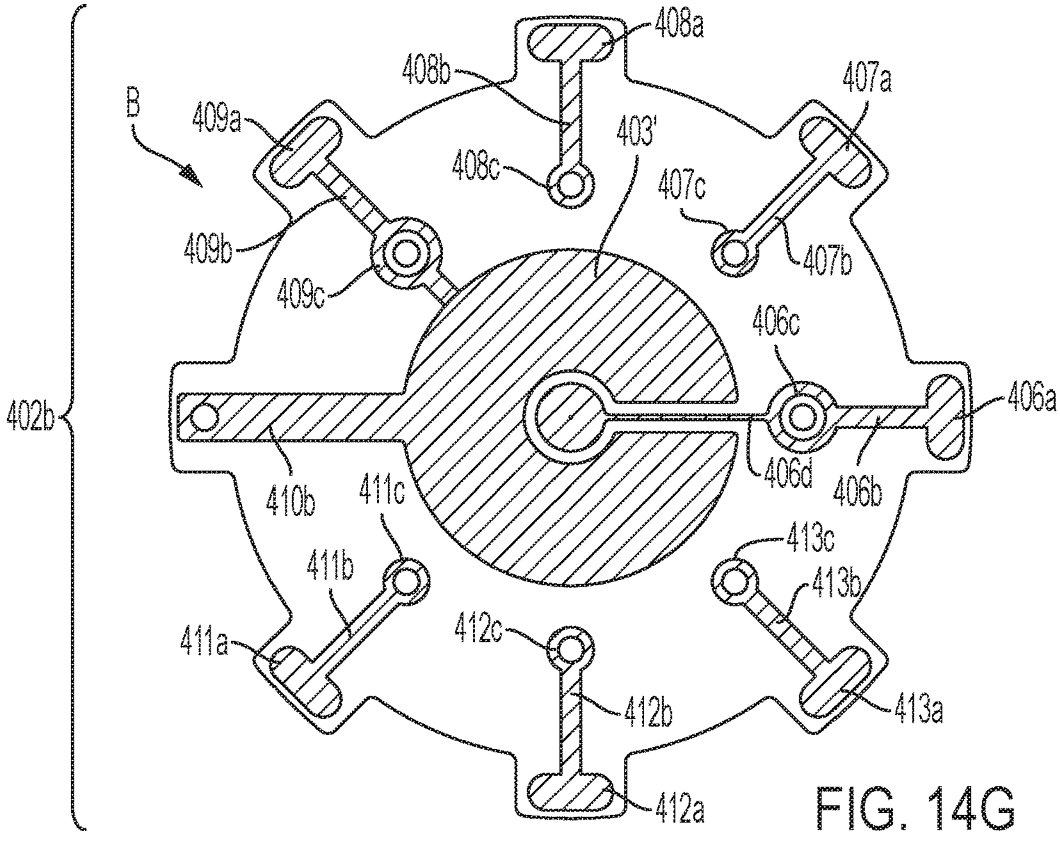
Figure 15:
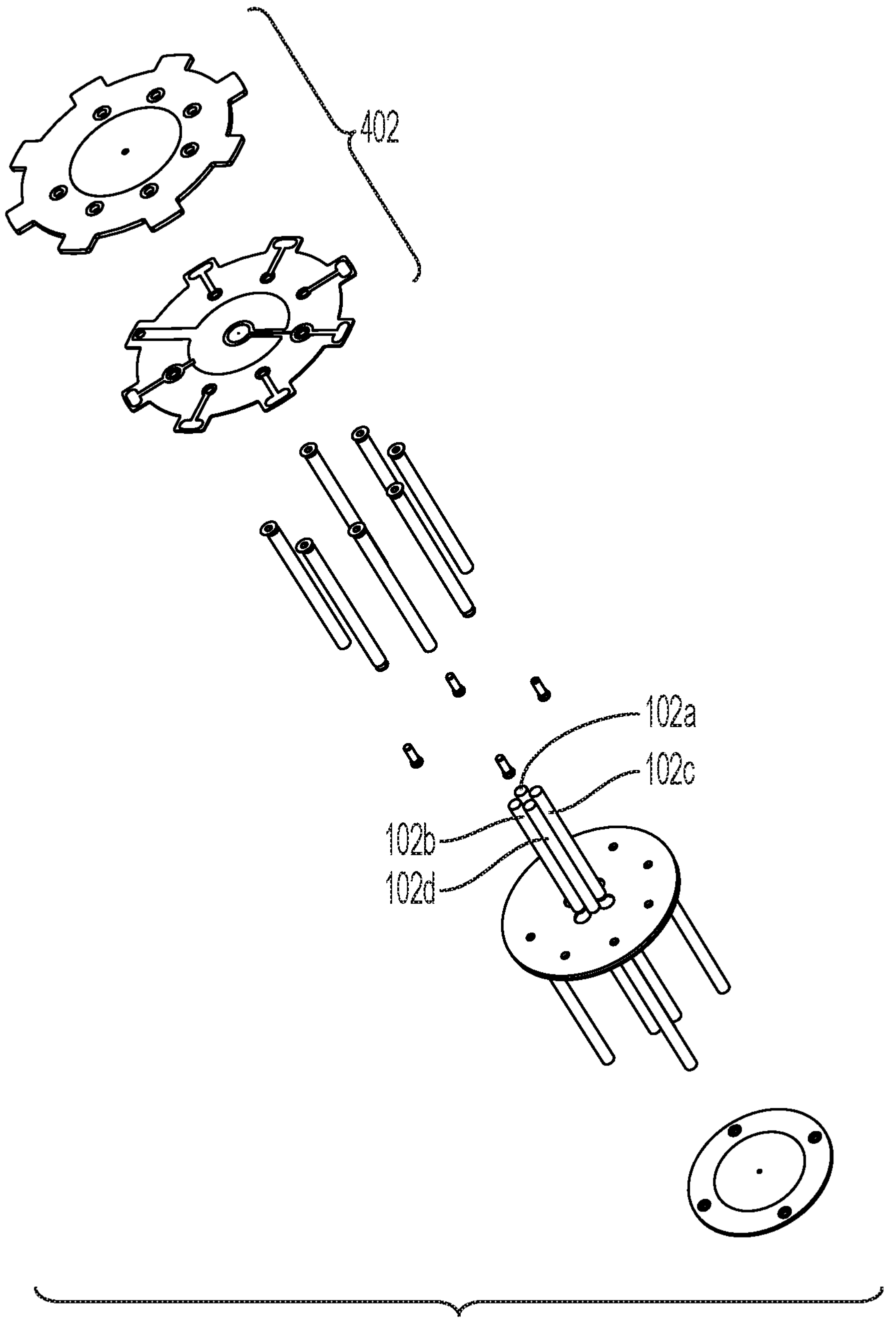
FIG. 15 is a schematic exploded view of the ion guide assembly depicted in FIG. 14A, FIG. 16 schematically depicts an example of a connecting rod suitable for use in the practice of the present teachings, which includes an electrically conductive core and an electrically insulating shell surrounding the core, FIG. 17 schematically depicts a mass spectrometer in which an ion guide assembly according to the present teachings is incorporated.

FIG. 14A shows the entire ion guide assembly 400 according to an embodiment having a curtain plate/orifice plate assembly 402 that includes a curtain plate 402*a* (See, FIG. 14D) and an orifice plate 402*b* (See, FIGS. 14F/14G) that are attached to one another so as to provide a chamber therebetween (herein referred to as a curtain chamber) through which a gas can flow. FIG. 14B is another perspective view of the entire ion guide assembly. FIG. 14C is a cross-sectional view of the entire ion guide assembly. FIG. 14D shows the front face of the curtain plate of the ion guide assembly having a central metallic portion 403*a* and an orifice 403*c* (the orifice plate includes a corresponding orifice such that ions can pass through). FIG. 14E is another perspective view of the entire ion guide assembly in which only the Q0 and QJet rods are shown. FIGS. 14F and 14G show, respectively, the front and the back face of the orifice plate, illustrating a central metallic portion 403 that extends to the back surface of the orifice plate, thus providing a conductive element that extends through the width of the orifice plate from the front face to the back face thereof. The front face of the orifice plate further includes an annular metallic portion 403' that partially surrounds the central metallic portion 403 as well as other conductive elements described in more detail below.

The curtain plate/orifice plate assembly includes a plurality of prongs 402'*a*, 402'*b*, 402'*c*, 402'*d*, 402'*e*, 402'*f*, 402'*g*, and 402'*h* (herein referred to collectively as prongs 402') and plurality of openings 405*a*, 405*b*, 405*c*, 405*d*, 405*e*, 405*f*, and 405*g* (herein collectively referred to as openings 405) that surround the central portion of the orifice plate.

With particular reference to FIGS. 14E, 14F, and 14G, in this embodiment, the prongs 402' support a plurality of electrical connectors 406, 407, 408, 409, 410, 411, 412, and 413.

These electrical connectors include electrically conductive elements (herein also referred to as electrically conductive pads) 406*a*, 407*a*, 408*a*, 409*a*, 410*a*, 411*a*, 412*a*, and 413*a*, respectively, where each of these electrically conductive elements is configured to allow access thereto via top surface of the curtain plate 402*a*. The conductive pads are electrically coupled to internal (inner) conductive radial segments 406*b*, 407*b*, 408*b*, 409*b*, 410*b*, 411*b*, 412*b*, and 413*b*, respectively, which are disposed on the top surface of the orifice plate 402*b*.

The conductive radial segments 406*b*, 407*b*, 408*b*, 409*b*, 411*b*, 412*b*, 413*b*, extend to circular conductive portions 406*c*, 407*c*, 408*c*, 409*c*, 411*c*, 412*c*, and 413*c*, respectively, which in turn surround the openings 405*a*, 405*b*, 405*c*, 405*d*, 405*e*, 405*f*, 405*g*, and 405*h*. The circular conductive portion 406*c* is connected via a radial conductive segment 406*d* to a conductive surface of the central metallic portion of the orifice plate. In addition, the conductive pad 410*b* is electrically coupled to the front conductive surface of the central metallic portion of the curtain plate/orifice plate assembly. Hence, the conductive pads 406*a* and 410*a* can be employed to apply voltages to the inner and outer central conductive portions of the curtain plate/orifice plate assembly.

An opening 405*e* provided in the prong 402'*e* allows introducing a gas into the space between the curtain plate and the orifice plate.

As discussed in more detail below, these connectors can be employed to apply voltages to various components of the ion guide assembly.

With particular reference to FIGS. 14A and 14E, the ion guide assembly 400 includes a first set of quadrupole rods 502*a*, 502*b*, 502*c*, and 502*d* (herein collectively referred to as QJet rods 502) that are arranged in a quadrupole configuration to allow ions passing through a channel provided therebetween. Although in this embodiment, the rods 502 have a quadrupole configuration, in other embodiments, they can have other multipole configurations, such as hexapole.

As shown in FIG. 14A, the ion guide assembly 400 further includes a second set of quadrupole rods 602*a*, 602*b*, 602*c*, and 604*d* (herein collectively referred to as Q0 rods), which are also arranged in a quadrupole configuration to allow passage of ions through a space provided therebetween. Similar to the rods 502, in other embodiments, the rods 602 can be arranged as other types of multipole rods (e.g., hexapole).

Similar to the previous embodiment, the ion guide assembly 400 includes a board 600 having a plurality of openings 2*a*, 2*b*, 2*c*, and 2*d* (herein collectively referred to as openings 2) through which the QJet rods 502 are coupled, via a plurality of connectors (not visible in this figure) similar to those described above in connection with the previous embodiment for coupling the QJet rods to the Q0 rods, to the Q0 rods, in a manner discussed above in connection with the previous embodiment. Similar to the previous embodiment, an ion lens (similar to the IQ0 lens discussed above) is provided in the board 600 for focusing the ions passing through the QJet region to enter the Q0 region.

With particular reference to FIGS. 14A, 14B, 14G and 14F, a conducive rod 700 is coupled at its proximal end to the orifice plate 402 via the opening 405*g* provided in the orifice plate. More specifically, in this embodiment, a threaded screw 701 can engage with internal threads provided in an opening in the proximal end of the conductive rod 700 so as to secure the proximal end of the conductive rod 700 to the orifice plate. At its distal end, the conductive rod 700 is coupled to the board 600 through an opening 703 provided in the board, e.g., via a screw 702 or via a press fit PCB connector. The rod 700 is electrically conductive and is electrically coupled to the conductive circular portion of the connector 412 provided on the orifice plate 402 to receive a voltage (e.g., a DC and/or an RF voltage) from a voltage source.

The distal end of the conductive rod 700 is electrically connected to an electrical trace provided in the board 600 (e.g., similar to the electrical trace 220*a* shown in FIG. 10A discussed above) to allow application of a voltage to the ion lens provided in the board 600. The electrical trace can be implemented, for example, in a manner similar to the implementation of the electrical traces discussed above in connection with the previous embodiments. As such, the rod 700 not only provides support for structurally maintaining the orifice plate 402 and the board 600 relative to one another but it also allows the application of a voltage to the ion lens provided in the board.

The ion guide assembly 400 further includes a substrate 800 that is positioned downstream of the board 600 and in which another ion lens 801 (herein referred to as IQ1 ion lens) is disposed. The substrate 800 and the IQ1 ion lens 801 are implemented in a manner similar to that discussed above in connection with the previous embodiment. Similar to the above ion lens 112, the IQ1 ion lens 801 includes conductive front and back surfaces (such as the conductive surfaces 112*a*/112*b* of the ion lens 112 discussed above and includes a central orifice through which ions can pass).

A conductive rod 900 extends from the orifice plate 402*b* to the substrate 800, via an opening 901 provided in the board 600, so as to electrically couple the front conductive surface of the IQ1 ion lens to one of the electrical connectors provided on the orifice plate. More specifically, the proximal end of the conductive rod 900 is coupled to the orifice plate 402*b* via the opening 405*d* provided in the orifice plate by means of a screw 901 having external threads that engage with internal threads provided in an opening in the proximal end of the conductive rod 901 such that the proximal end of the conductive rod 901 is in electrical contact with conductive circular portion of the electrical connector 409 provided on the orifice plate. The distal end of the conductive rod 900 is secured to the substrate 800 via an opening 802 (see also FIG. 14B) by means of a screw having external threads that engage with internal threads provided in an opening at the distal end of the conductive rod 900. The distal end of the conductive rod 900 is electrically connected via an electrical trace (not visible in FIG. 14A) provided in the substrate 800 to the front conductive surface of the IQ1 ion lens 801 so as to allow the application of a voltage thereto. As noted above, the electrical trace can be implemented in a manner similar to the implementation of the electrical traces discussed above in connection with the previous embodiment.

Another conductive rod 1000 extends from the orifice plate 402*b* to the substrate 800 via another opening 1001 provided in the board 600. More specifically, the conductive rod 1000 is secured at its proximal end to the orifice plate 402*b* via the opening 405*f* provided in the orifice plate by means of a screw 1002 having external threads that engage with internal threads provided in an opening in the proximal end of the conductive rod 1000. The distal end of the conductive rod 1000 is secured to the substrate 800 via an opening 803 (see FIG. 14A) provided in the substrate 800. In this embodiment, a screw having external threads can engage with internal threads provided at the distal end of the rod 1000 so as to secure the distal end of the rod 1000 to the substrate 800. In other embodiments, other mechanisms, such as a friction fit, may be employed. The distal end of the conductive rod 1000 is electrically coupled via an electrical trace provided in the substrate 800 to the back conductive surface of the IQ1 lens 801 so as to allow application of a voltage thereto. The electrical trace can be implemented in a manner discussed above in connection with the electrical trace provided for applying a voltage to the IQ1 lens.

Figure 18:
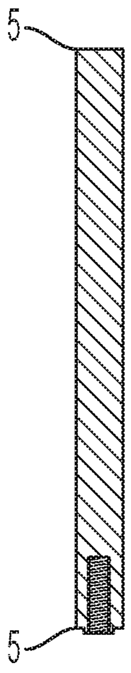
FIG. 18 shows that in some embodiments the rods can have a machined step at their ends to facilitate their coupling to an opening (e.g., an opening provided in the board or the orifice plate).

In some embodiments, as shown schematically in FIG. 18, the conductive QJet and Q0 rods include a step 5 for engaging with holes in the IQ0 board. The support rods can include internally-threaded openings at their ends for engaging with screws for holding the rods in place.

Accordingly, the two conductive rods 900 and 1000 allow the application of a voltage differential across the IQ1 lens so as to provide a desired electric field profile in proximity of the orifice of the IQ1 lens for focusing the ions passing therethrough as they exit the ion guide assembly to enter downstream components of a mass spectrometer in which the ion guide assembly 400 is disposed. Further, each of the two conductive rods 900 and 1000 contributes to the structural stability of the ion guide assembly by ensuring proper positioning of the orifice plate 402*b*, the board 600 and the substrate 800 relative to one another.

Figure 16:
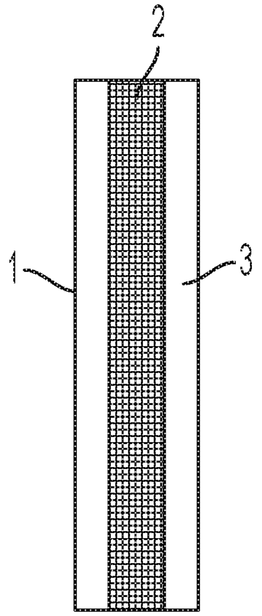

Any of the conductive rods discussed above can be formed fully or partially of an electrically conductive material, such as a metal, to allow transmission of a voltage applied at its proximal end to its distal end, and via its distal end, to IQ0 or IQ1 lenses. For example, as shown schematically in FIG. 16, in some embodiments, such a rod 1 can include an electrically non-conductive core 2 that is surrounded by an electrically conductive shell 3. Alternatively, the entire rod 1 can be formed of an electrically conductive material.

While the above rods 700, 900 and 1000 provide not only conductive paths for application of voltages to the ion lenses incorporated in the ion guide assembly 400 but also provide structural stability to the ion guide assembly, in some embodiments, one or more rods can be employed solely for providing structural stability to the ion guide assembly.

By way of example, in this embodiment, the ion guide assembly 400 includes two rods 2000 and 3000 (See, FIG. 14B) that extend from the orifice plate 402*b* to the substrate 800 to help maintain the structural integrity of the ion guide assembly. More specifically, in this embodiment, the rod 3000 is secured at its proximal end to the orifice plate through the opening 405*b* provided in the orifice plate and the rod 2000 is secured at its proximal end to the orifice plate through the opening 405*h*. Although both openings 405*b* and 405*h* are associated with electrical connectors provided on the orifice plate, in this embodiment, the rods 2000 and 3000 are employed only as structurally supporting rods and are not used to apply voltages to the ion lenses incorporated in the board 600 and/or the substrate 800.

In some embodiments, the ion guide assembly 400 is configured such that the proximal ends of the quadrupole rod set 502 are positioned within a few millimeters of the orifice plate 402*b* (e.g., 0.5-3 mm) and the distal ends of the quadrupole rod set 602 are positioned within a few millimeters of the ion lens 801 (e.g., 0.5-3 mm).

The ion guide assemblies according to the present teachings, such as the above ion guide assemblies 100 and 400 provide a number of advantages. By way of example, such an ion guide assembly provides a modular unit that can be readily removed and replaced. In some cases, the ion guide assembly can be formed as a single-use disposable unit that can be discarded after use, thereby eliminating the need for time-consuming and expensive clean-up after each use.

Figure 17:
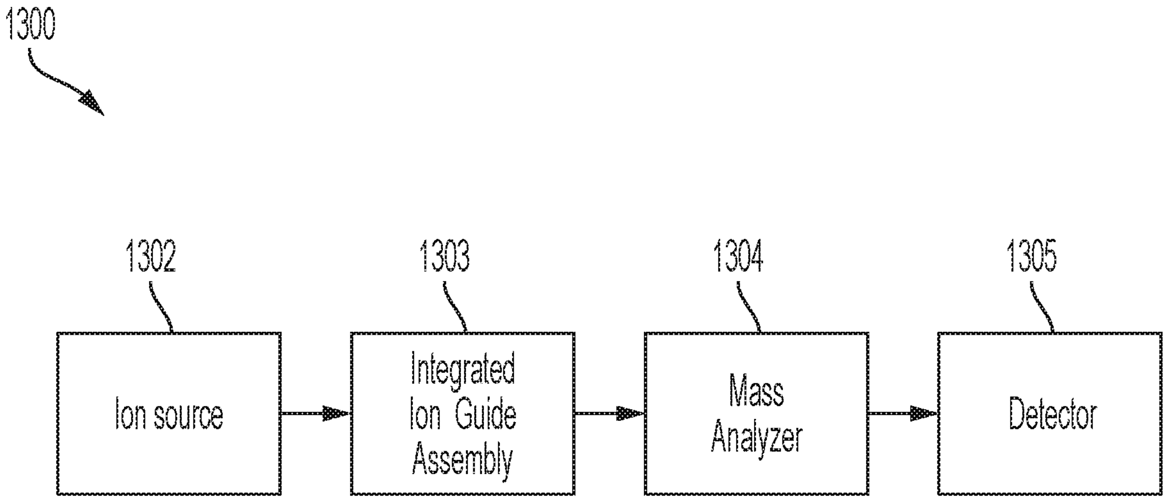

The ion guide assemblies disclosed herein can be employed in a variety of different mass spectrometers. By way of example, FIG. 17 schematically depicts a mass spectrometer 1300 that includes an ion source 1302 for generating an ion beam comprising a plurality of ions. The ion source can be separated from the downstream section of the spectrometer by a curtain chamber (not shown). An integrated ion guide assembly 1303 according to the present teachings, such as the above ion guide assembly 100, can be incorporated into the mass spectrometer 1300. In some embodiments, the integrated ion guide assembly includes an orifice plate (See, e.g., ion guide assembly 400), while in others the integrated ion guide assembly according to the present teachings does not include an orifice plate as part of the assembly. In such embodiments, the ion guide assembly can be disposed downstream of an orifice plate provided in the mass spectrometer.

In use, the QJet rods can be employed to capture and focus the ions received through the orifice using a combination of gas dynamics and radio frequency fields. The ions pass through the QJet region and are focused via the IQ0 lens into the downstream Q0 region. In some embodiments, the application of RF voltages to the Q0 rods confine the ions in proximity of the central axis and allow the ions to enter a downstream quadrupole mass analyzer Q1, which can include four quadrupole rods positioned in a vacuum chamber that can be evacuated to a pressure, for example, less than about $1\times10^{-4}$ Torr (e.g., about $5\times10^{-5}$ Torr).

As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1. By way of example, in some embodiments, the quadrupole rod set Q1 can be configured as an ion trap. In some aspects, the ions can be Mass-Selective-Axially Ejected from the Q1 ion trap in a manner described by Hager in “A new linear ion trap mass spectrometer,” Rapid Commun. Mas Spectro. 2002: 16:512-526.

The illustrated mass spectrometer 1300 can include one or more mass analyzers 1304 (e.g., quadrupole or time-of-flight (ToF) analyzers) that are positioned downstream of the Q1 mass analyzer. Further, in some implementations, a collision cell (not shown) may be positioned downstream of the Q1 quadrupole to cause fragmentation of parent ions into product ions to allow detection of MRM (multiple reaction monitoring) transitions. An ion detector 1305 can detect the ions and generate a signal indicative of the intensity of the detected ions. An analyzer (not shown) can operate on the signals generated by the ion detector to generate a mass spectrum.

Those having ordinary skill in the art will appreciate that various changes can be made to the above embodiments without departing from the scope of the invention.

What is claimed is:

1. An ion guide assembly for use in a mass spectrometry system, comprising:

a first plurality of multipole rods arranged to allow passage of ions therebetween, a second plurality of multipole rods arranged to allow passage of ions therebetween, and a board disposed between said first and second plurality of multipole rods, said board comprising an ion lens, wherein said first and second plurality of multipole rods are coupled to said board so as to be pairwise aligned through a plurality of openings in said board, and to be in pairwise electrical contact with one another.

2. The ion guide assembly of claim 1, wherein said first and said second plurality of multipole rods have cylindrical shapes.

3. The ion guide assembly of claim 2, wherein said first and second plurality of multipole rods have substantially the same diameter.

4. The ion guide assembly of claim 1, wherein said first and second plurality of multipole rods are electrically coupled to the same radio frequency (RF) voltage source.

5. The ion guide assembly of claim 1, wherein said first and second plurality of multipole rods are electrically coupled to the same direct current (DC) voltage source.

6. The ion guide assembly of claim 1, wherein said first and second plurality of multipole rods are aligned and physically coupled to one another through said board by a plurality of connectors.

7. The ion guide assembly of claim 6, wherein said plurality of connectors have a length in a range of about 60 mm to about 75 mm.

8. The ion guide assembly of claim 6, wherein said first and second plurality of multipole rods are aligned and physically coupled to one another through said board via any of a male-to-female and female-to-female threaded connection.

9. The ion guide assembly of claim 1, wherein each of said first and second plurality of multipole rods are arranged in a quadrupole configuration;

optionally, wherein each of said first and second plurality of multipole rods are arranged in a hexapole configuration.

10. The ion guide assembly of claim 1, wherein said first and second plurality of multipole rods are disposed in first and second evacuated chambers and said board is configured to provide a vacuum seal between said first and second evacuated chambers.

11. An ion guide assembly for use in a mass spectrometry system, comprising:

an orifice plate having an orifice for receiving ions from an ion source, said orifice plate comprising a plurality of electrical connectors for coupling to one or more voltage sources, a first set of multipole rods having proximal ends and distal ends, and arranged to allow passage of ions between the proximal ends of the first set of multipole rods and the distal ends of the first set of multipole rods, wherein the proximal ends of the first set of multipole rods are closer to the orifice plate than the distal ends of the first set of multipole rods are to the orifice plate, a second set of multipole rods having proximal ends and distal ends, and arranged to allow passage of ions between the proximal ends of the second set of multipole rods and the distal ends of the second set of multipole rods, and wherein the proximal ends of the second set of multipole rods are closer to the orifice plate than the distal ends of the second set of multipole rods are to the orifice plate, a board disposed between the first and second sets of multipole rods, said board having a plurality of openings through which the first and second sets of multipole rods are pairwise aligned and connected to one another, said board comprising a first ion lens and an electrical trace for application of a voltage to said first ion lens, and a first electrically conductive rod electrically coupling a first one of said electrical connectors of the orifice plate to said electrical trace for transmission of a voltage from at least one of said voltage sources to said first ion lens.

12. The ion guide assembly of claim 11, wherein said first electrically conductive rod is configured to physically connect said orifice plate to said board for structurally maintaining the board relative to the orifice plate.

13. The ion guide assembly of claim 11, further comprising a plurality of connectors for coupling the distal ends of said first set of multipole rods to said proximal ends of said second set of multipole rods.

14. The ion guide assembly of claim 13, wherein said plurality of connectors are electrically conductive;

optionally, wherein said plurality of connectors are electrically insulating.

15. The ion guide assembly of claim 11, further comprising a substrate disposed in proximity of the distal ends of said second set of multipole rods.

16. The ion guide assembly of claim 15, further comprising a second ion lens disposed in a recess provided in said substrate;

optionally, wherein said second ion lens comprises two opposed front and back conductive surfaces and an orifice extending between said two surfaces and configured to allow passage of ions therethrough.

17. The ion guide assembly of claim 11, further comprising a pair of conductive rods, wherein one of said conductive rods electrically couples a second one of said electrical connectors of the orifice plate to said front conductive surface of the second lens and the other one of said conductive rods electrically couples a third one of said electrical connectors to said back conductive surface of the second ion lens for application of a differential voltage across said front and back conductive surfaces of the second ion lens;

optionally, wherein said pair of conductive rods physically connect said orifice plate to said substrate via a two openings provided in said board for structurally maintaining said orifice plate, the board, and the substrate relative to one another.

18. The ion guide assembly of claim 17, further comprising at least another rod extending from said orifice plate to said substrate via an opening provided in said board for providing additional support for structurally maintaining said orifice plate, said board and said substrate relative to one another;

optionally, wherein said at least another rod is not configured for transmission of an electrical voltage to a component of the ion guide assembly.

19. The ion guide assembly of claim 11, wherein each of said first and second sets of multipole rods are arranged in a quadrupole configuration;

optionally, wherein each of said first and second sets of multipole rods are arranged in a hexapole configuration.

20. The ion guide assembly of claim 11, wherein said first and said second sets of multipole rods have substantially identical diameters;

optionally, wherein said first and said second sets of multipole rods have substantially identical inner spacing between the rods.

* * * * *